(12) United States Patent
Sivakumar et al.

(10) Patent No.: US 9,655,003 B2
(45) Date of Patent: May 16, 2017

(54) SYSTEMS AND METHODS FOR IMPROVED WIRELESS INTERFACE AGGREGATION

(75) Inventors: Raghupathy Sivakumar, Atlanta, GA (US); Cheng-Lin Tsao, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 319 days.

(21) Appl. No.: 13/256,749

(22) PCT Filed: Mar. 19, 2010

(86) PCT No.: PCT/US2010/028051
§ 371 (c)(1),
(2), (4) Date: Nov. 16, 2011

(87) PCT Pub. No.: WO2010/108144
PCT Pub. Date: Sep. 23, 2010

(65) Prior Publication Data
US 2012/0057511 A1 Mar. 8, 2012

Related U.S. Application Data

(60) Provisional application No. 61/299,617, filed on Jan. 29, 2010, provisional application No. 61/161,618, filed on Mar. 19, 2009.

(51) Int. Cl.
*H04B 7/00* (2006.01)
*H04W 28/06* (2009.01)
*H04W 28/22* (2009.01)
*H04W 88/06* (2009.01)

(52) U.S. Cl.
CPC ............ *H04W 28/06* (2013.01); *H04W 28/22* (2013.01); *H04W 88/06* (2013.01)

(58) Field of Classification Search
CPC . H04L 29/08837; G04F 3/0481; H04W 28/06
USPC .................. 370/231, 237, 310, 395.5, 395.52
See application file for complete search history.

(56) References Cited

U.S. PATENT DOCUMENTS

| | | | |
|---|---|---|---|
| 6,842,446 B2 | 1/2005 | Everson | |
| 7,286,853 B2 | 10/2007 | Meier | |
| 7,373,543 B1 | 5/2008 | Jain | |
| 2003/0032391 A1* | 2/2003 | Schweinhart et al. | 455/12.1 |
| 2003/0103452 A1* | 6/2003 | Le et al. | 370/328 |
| 2003/0128672 A1 | 7/2003 | Komandur | |

(Continued)

*Primary Examiner* — Guang Li
(74) *Attorney, Agent, or Firm* — Smith, Gambrell & Russell

(57) ABSTRACT

The present invention describes systems and methods for improved wireless interface integration. An exemplary embodiment of the present invention provides a wireless interface aggregation system having a computing device including a processor, a memory, a first wireless interface with a first observed throughput rate in a first network environment and second wireless interface with a second observed throughput rate in the first network environment. The aggregation control module is configured to control the transmission and wireless interface and the second wireless interface to provide an overall throughput rate for the computing device in the first network environment greater than sum of the first observed throughput rate and the second observed throughput rate.

21 Claims, 13 Drawing Sheets

(56) References Cited

U.S. PATENT DOCUMENTS

| | | | |
|---|---|---|---|
| 2005/0014703 A1* | 1/2005 | Demuth | A61K 31/00 514/183 |
| 2006/0026296 A1* | 2/2006 | Nagaraj | 709/233 |
| 2006/0062142 A1* | 3/2006 | Appanna et al. | 370/219 |
| 2006/0067333 A1 | 3/2006 | Sivakumar | |
| 2006/0098573 A1 | 5/2006 | Beer | |
| 2006/0126619 A1* | 6/2006 | Teisberg et al. | 370/389 |
| 2006/0129676 A1* | 6/2006 | Modi et al. | 709/227 |
| 2006/0165074 A1* | 7/2006 | Modi et al. | 370/389 |
| 2006/0223541 A1 | 10/2006 | Famolari | |
| 2007/0005787 A1* | 1/2007 | Igarashi et al. | 709/230 |
| 2007/0025395 A1* | 2/2007 | Cardona et al. | 370/474 |
| 2007/0060158 A1* | 3/2007 | Medepalli et al. | 455/450 |
| 2007/0091805 A1* | 4/2007 | Ramprashad et al. | 370/230.1 |
| 2007/0240209 A1* | 10/2007 | Lewis et al. | 726/15 |
| 2007/0280181 A1* | 12/2007 | Matsuo et al. | 370/338 |
| 2008/0130538 A1* | 6/2008 | Raissinia | H04W 28/06 370/310 |
| 2008/0170501 A1* | 7/2008 | Patel et al. | 370/235 |
| 2008/0219164 A1* | 9/2008 | Shimonishi | 370/235 |
| 2008/0228864 A1* | 9/2008 | Plamondon | 709/203 |
| 2008/0259841 A1* | 10/2008 | Deshpande | 370/328 |
| 2008/0267184 A1* | 10/2008 | Arisoylu et al. | 370/391 |
| 2008/0320188 A1* | 12/2008 | Luo et al. | 710/104 |
| 2009/0041100 A1* | 2/2009 | Kimmich et al. | 375/220 |
| 2009/0086652 A1* | 4/2009 | Jain et al. | 370/254 |
| 2009/0129276 A1* | 5/2009 | Dendy | 370/236 |
| 2009/0129346 A1* | 5/2009 | Hong | 370/338 |
| 2009/0141631 A1* | 6/2009 | Kim et al. | 370/235 |
| 2009/0185560 A1* | 7/2009 | Venkatesan et al. | 370/389 |
| 2009/0296612 A1* | 12/2009 | Joshi | H04W 28/06 370/310 |
| 2010/0014419 A1* | 1/2010 | Lee et al. | 370/225 |
| 2010/0020852 A1* | 1/2010 | Erell et al. | 375/141 |
| 2010/0061284 A1* | 3/2010 | Chen et al. | 370/311 |
| 2010/0165920 A1* | 7/2010 | Chen | 370/328 |
| 2010/0202427 A1* | 8/2010 | Xia et al. | 370/338 |
| 2011/0085524 A1* | 4/2011 | Soliman | H04W 48/10 370/338 |
| 2012/0023252 A1* | 1/2012 | Helmke | 709/231 |

* cited by examiner

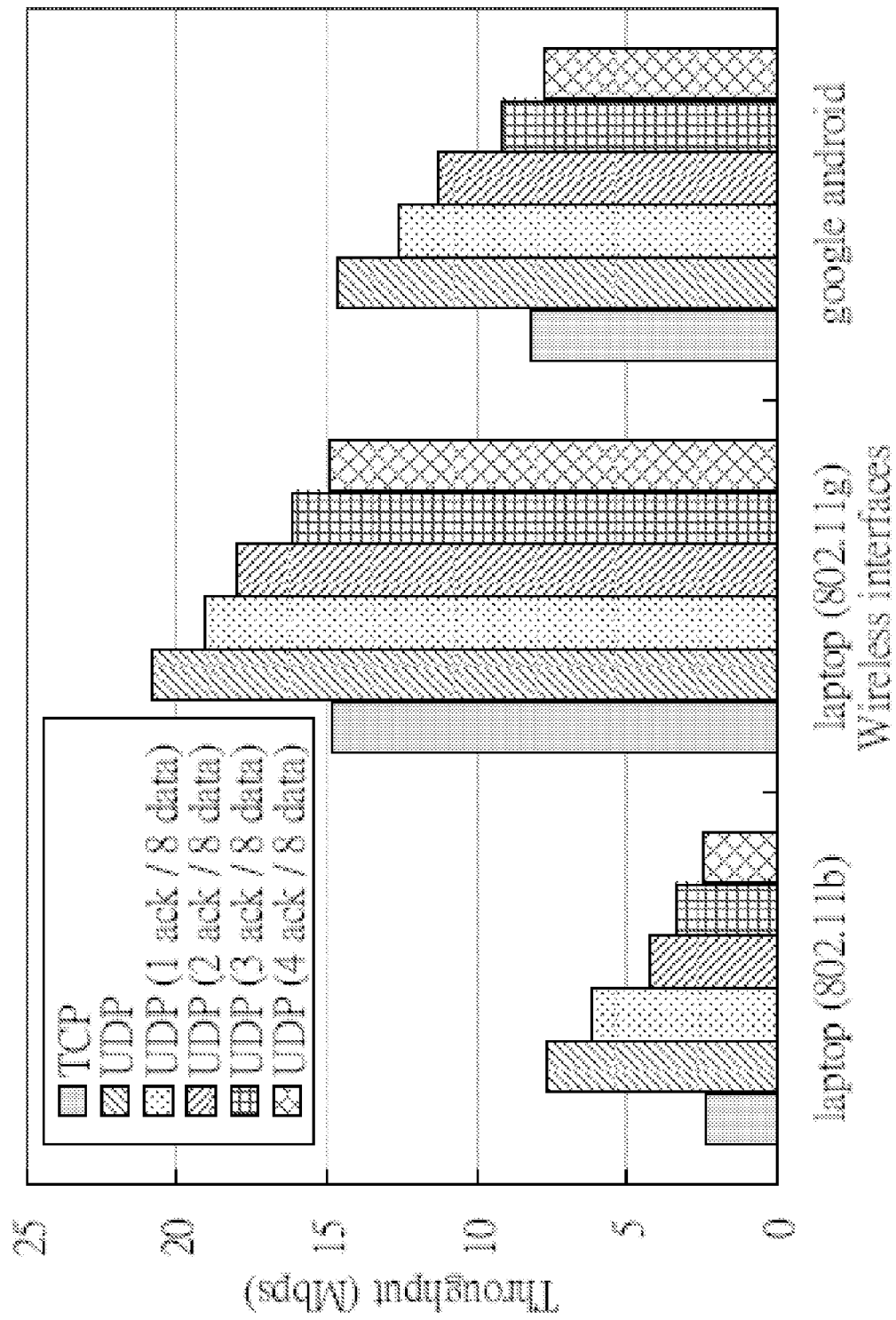
FIG. 2A - Prior Art

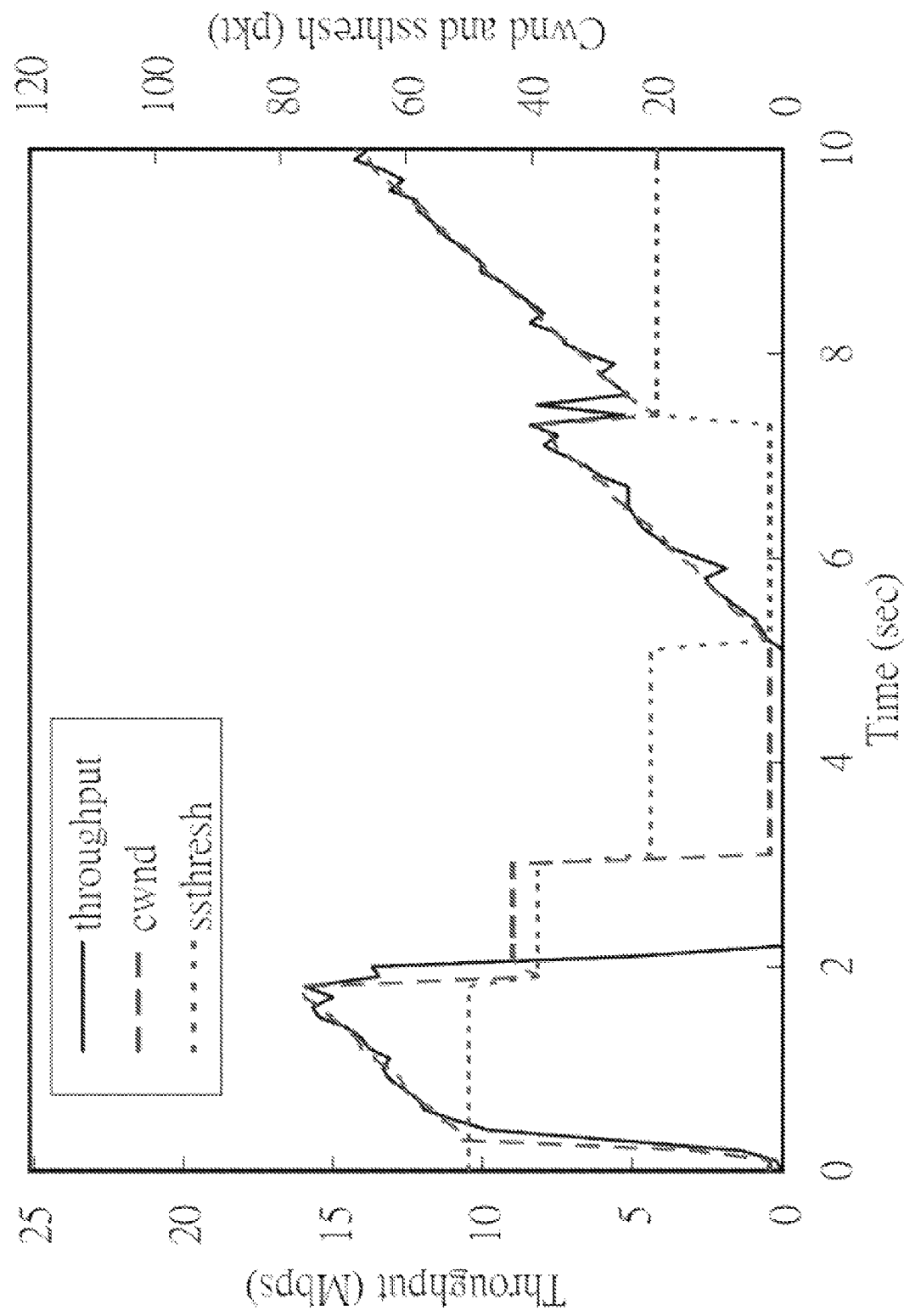
FIG. 2B - Prior Art

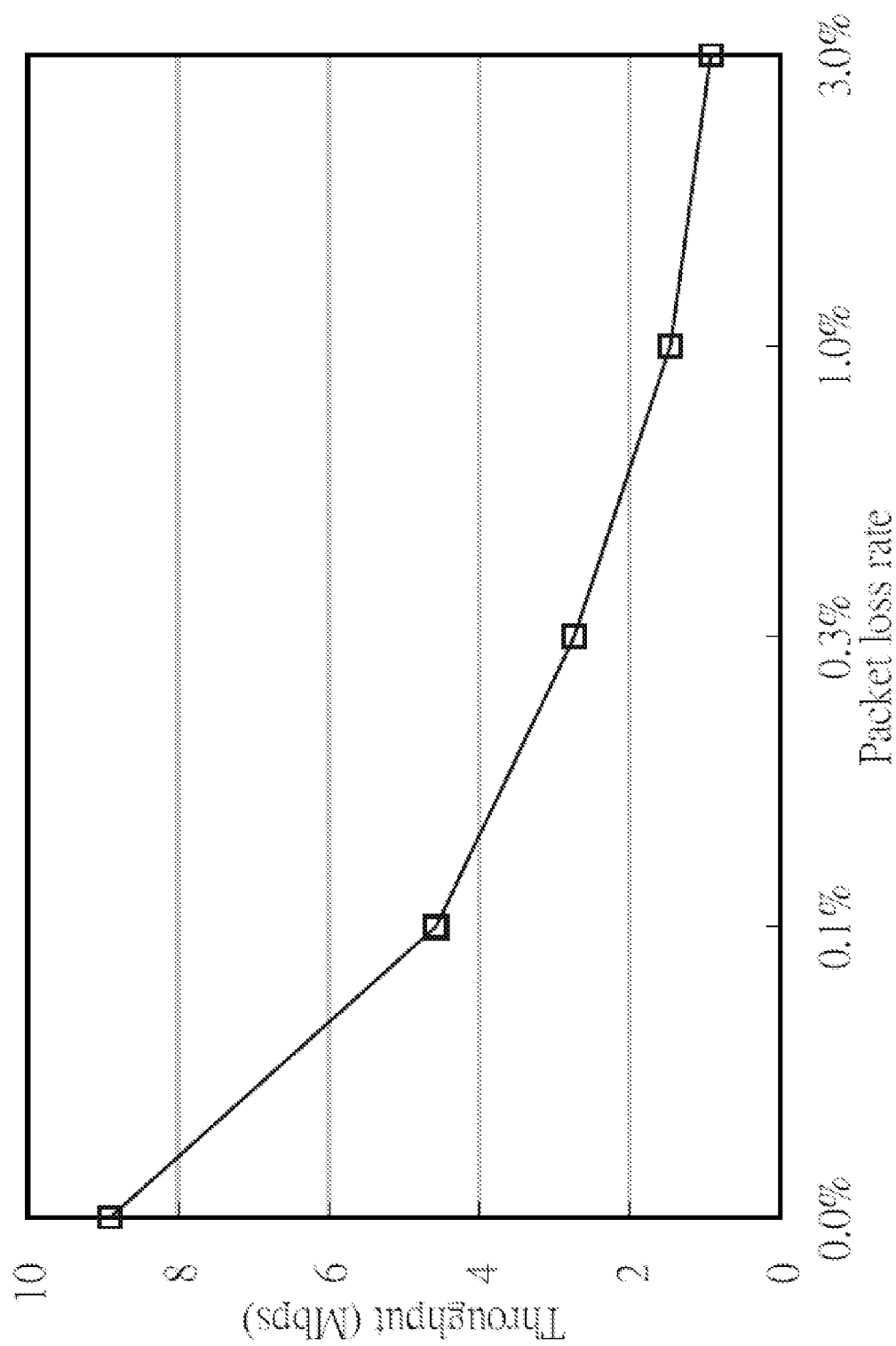
FIG. 2C - Prior Art

SYSTEMS AND METHODS FOR IMPROVED WIRELESS INTERFACE AGGREGATION

CROSS REFERENCE TO RELATED APPLICATIONS

This application is a 35 U.S.C. §371 U.S. National Stage of International Application No. PCT/US2010/028051 filed 19 Mar. 2010 which is identified by the title "Systems And Methods For Improved Wireless Interface Aggregation," which claims the benefit of U.S. Provisional Patent Application Ser. No. 61/299,617, filed 29 Jan. 2010, which is identified by the title "Super Aggregation: Multihoming for Wireless Devices," and claims the benefit of U.S. Provisional Patent Application Ser. No. 61/161,618 filed 19 Mar. 2009, which is identified by the title "Super Aggregation: Multihoming for Wireless Devices." The entire contents and substance of the above-cited documents are hereby incorporated by reference as if fully set forth below.

FIELD OF THE INVENTION

The present invention relates generally to systems and methods for providing wireless data connectivity and, more particularly, to systems and methods for providing improved wireless interface aggregation.

BACKGROUND

As the proliferation of mobile computing increases at an exponential pace, the demand for fast and reliable data connectivity for mobile computing devices in a variety of different network environments grows at an equivalent fast pace. To cater to the demands of mobile users, most mobile devices today are equipped with multiple and heterogeneous wireless interfaces. For example, it is now commonplace for a laptop to be equipped with WiFi, Bluetooth, and 2.5G/3G wireless interfaces. Similarly, popular mobile phones today ranging from the iPhone to the Google Android phone to the Blackberry can come equipped with multiple wireless data interfaces.

The expansion in the number of wireless interfaces available on a mobile computing device has brought about conventional attempts to improve the use of those multiple wireless interfaces. Conventional architectures have used the "one-interface at a time" approach or the "simultaneous use of multiple interfaces" approach. As wireless interfaces are innately limited and heterogeneous in capabilities, it may be possible to improve overall data connectivity through the simultaneous use of multiple interfaces.

The majority of conventional systems addressing this issue implement bandwidth aggregation. In other words, if there are two interfaces I1 and I2 available with respective bandwidths of B1 and B2, the conventional systems focus on delivering the aggregate bandwidth of B1+B2 to the user. This configuration is often referred to as simple aggregation. Unfortunately conventional systems using simple aggregation typically do not result in meaningful benefits to the user. Consider, for example, a mobile phone that supports both 3G and Wi-Fi data interfaces. 3G data rates support bandwidths of up to 100-500 Kbps while Wi-Fi interfaces support 2-54 Mbps. A simple aggregation of the bandwidths provided by the two interfaces will provide negligible improvement in terms of performance perceived by the user, with respect to a best-available-interface solution.

Therefore, it would be advantageous to provide an apparatus and method for intelligently aggregating multiple wireless interfaces to improve overall throughput rate.

Additionally, it would be advantageous to provide an apparatus and method to provide a system that could dynamically adjust the wireless interface aggregation based on the conditions of the network and the data being transmitted.

Additionally, it would be advantageous to provide an improved system and method for providing a wireless interface aggregation system that could be implemented entirely in the user device so as to be compatible in all networks.

BRIEF SUMMARY

The present invention describes systems and methods for improved wireless interface aggregation. An exemplary embodiment of the present invention provides a wireless interface aggregation system having a computing device including a processor, a memory, a first wireless interface with a first observed throughput rate in a first network environment and second wireless interface with a second observed throughput rate in the first network environment. The aggregation control module is configured to control the transmission and reception of data packets with the first wireless interface and the second wireless interface to provide an overall throughput rate for the computing device in the first network environment greater than sum of the first observed throughput rate and the second observed throughput rate.

In addition to wireless interface aggregation systems, the present invention provides a method for wireless interface aggregation that involves providing a computing device comprising a processor, a memory, a first wireless interface with a first observed throughput rate in a first network environment and second wireless interface with a second observed throughput rate in the first network environment. The method for wireless interface aggregation further involves controlling the transmission and reception of a plurality of data packets via the first wireless interface and the second wireless interface to provide an overall throughput rate for the computing device in the first network environment greater than sum of the first observed throughput rate and the second observed throughput rate.

These and other objects, features and advantages of the present invention will become more apparent upon reading the following specification in conjunction with the accompanying drawing figures.

BRIEF DESCRIPTION OF THE FIGURES

FIG. 2A provides an illustration of throughput measurements for various computing devices 105, including a laptop and a mobile telephone, as observed in a given environment.

FIG. 2B shows the state of a TCP connection for a conventional computing device during a loss or connectivity or blackout.

FIG. 2C shows the TCP transmission protocol throughput rate observed at a conventional computing device when random wireless losses are present in the wireless network environment.

DETAILED DESCRIPTION

Figure 1A:
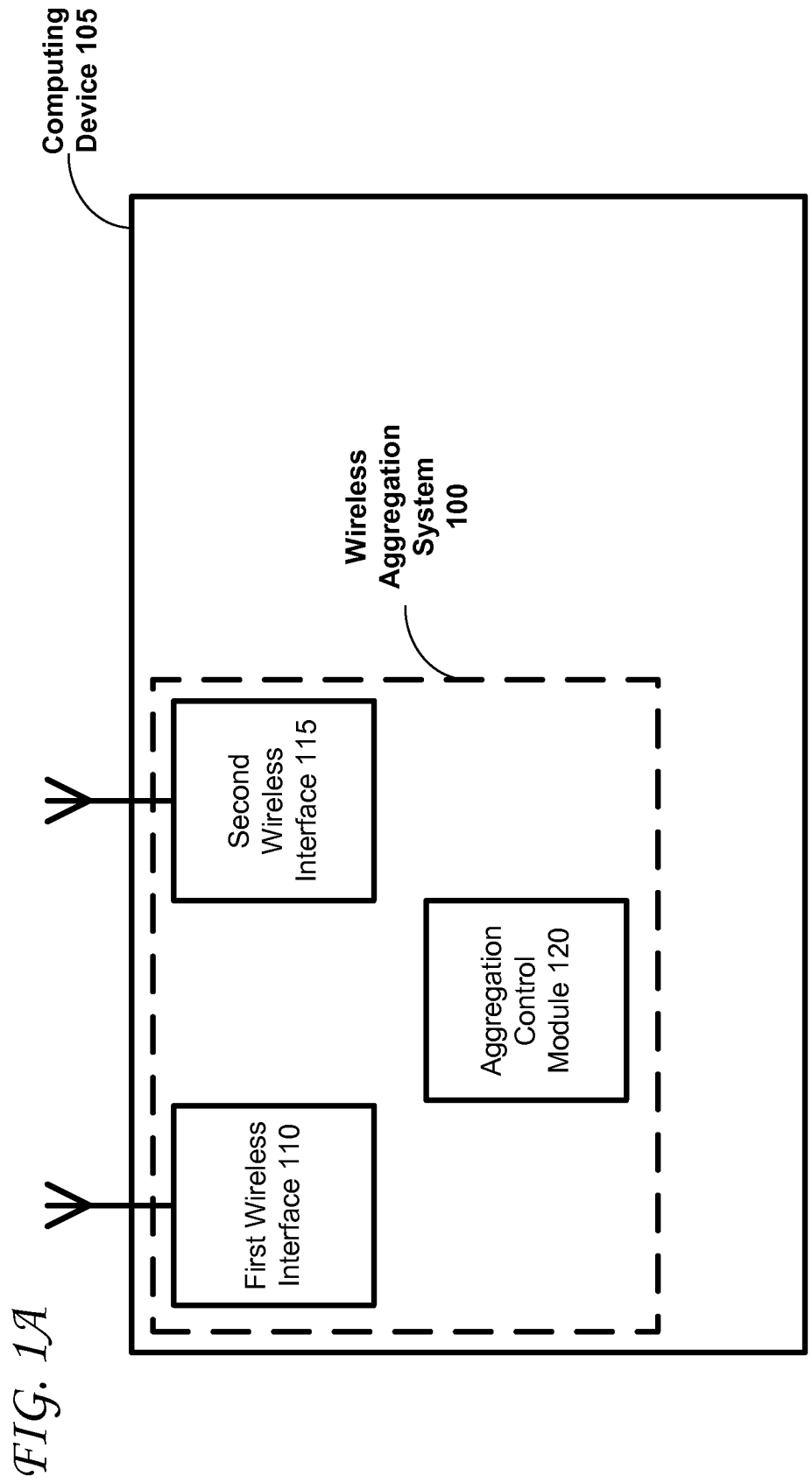
FIG. 1A provides an illustration of a block diagram of a wireless interface aggregation system 100 in accordance with an exemplary embodiment of the present invention.

The present invention addresses the deficiencies in the prior art concerning the inability to provide intelligent wireless interface aggregation. Significantly, the present invention provides methods and apparatus for providing enhanced wireless interface aggregation. A wireless interface aggregation system provided in accordance with the present invention is enabled to control two or more wireless interfaces. The present invention overcomes the drawbacks of the conventional methods and systems in the prior art and provides systems and methods for wireless interface aggregation that provide a throughput rate which is greater than the combination of the observed throughput capacities of the two wireless interfaces. Furthermore, provides systems and methods that can dynamically adjust the wireless interface aggregation based on the conditions of the network and the data being transmitted An exemplary embodiment of the present invention provides a wireless interface aggregation system having a computing device including a processor, a memory, a first wireless interface with a first observed throughput rate in a first network environment and second wireless interface with a second observed throughput rate in the first network environment. The first observed throughput rate is the data transmission rate observed at the first wireless interface in the first network environment. In other works, the data transmission rate achieved by the computing device on the first wireless interface at a given time in a given network environment. The first network environment is a particular wireless environment in which the computing device 105 can reside. Similarly, the second observed throughput rate is the data transmission rate observed at the second wireless interface in the first network environment. The aggregation control module is configured to control the transmission and reception of data packets with the first wireless interface and the second wireless interface to provide an overall throughput rate for the computing device in the first network environment greater than sum of the first observed throughput rate and the second observed throughput rate. The overall throughput rate is the combined throughput rate achieved by the computing device 105 over the first wireless interface and the second wireless interface.

In addition to wireless interface aggregation systems, the present invention provides a method for wireless interface aggregation that involves providing a computing device comprising a processor, a memory, a first wireless interface with a first observed throughput rate in a first network environment and second wireless interface with a second observed throughput rate in the first network environment. The method for wireless interface aggregation further involves controlling the transmission and reception of a plurality of data packets via the first wireless interface and the second wireless interface to provide an overall throughput rate for the computing device in the first network environment greater than sum of the first observed throughput rate and the second observed throughput rate.

The wireless interface aggregation systems enabled by the present invention present significant advantages to data transmission for computing devices, such as mobile phones, laptops, netbooks, and tablet computers. Specifically, the wireless interface aggregation systems enabled by the present invention provide significant advancements in both throughput rate and wireless data transmission reliability. In addition to wireless data transmission, the wireless interface aggregation systems enabled by the present invention can also be implemented in almost any data transmission application, wired or wireless, in which a computing device has multiple data transmission interfaces.

Significantly, the wireless interface aggregation system, in accordance with an exemplary embodiment of the present invention, offers significant improvements over conventional simple aggregation techniques. Notably, the wireless interface aggregation system can provide a combined throughput that is greater than the combination of the observed throughputs for the multiple wireless interfaces of a computing device. Various exemplary embodiments of the methods of wireless interface aggregation in accordance the present invention can incorporate different aggregation techniques provided. First, an exemplary embodiment of the method of wireless interface aggregation can involve selective offloading, in which transmission data from a first wireless interface, such as control data or acknowledgments, can be intelligently rerouted to a second wireless interface. Second, an exemplary embodiment of the method of wireless interface aggregation can involve proxying, in which critical control information relating to transmission data on a first wireless interface can be transmitted by the second wireless interface to improve the overall performance of data transfer. Third, an exemplary embodiment of the method of wireless interface aggregation can involve mirroring, in which certain portions of data being transferred on a second wireless interface can mirror data transferred on a first wireless interface.

The majority of the embodiments of the wireless interface aggregation system and methods of wireless interface aggregation disclosed herein involve a first wireless interface and a second wireless interface. Those of skill in the art will appreciate, however, that various embodiments of the wireless interface aggregation system and methods of wireless interface aggregation can involve three or more wireless interfaces. Furthermore, the wireless interface aggregation systems provided in accordance with an exemplary embodiment of the present invention can leverage the properties of a first relatively low bandwidth interface that may be superior to those of a second relatively high bandwidth interface to relieve any bottlenecks that prevent the effective utilization of the high bandwidth interface.

FIG. 1A provides an illustration of a block diagram of a wireless interface aggregation system 100 in accordance with an exemplary embodiment of the present invention. As shown in FIG. 1A, the wireless interface aggregation system 100 can be implemented in a computing device 105. The computing device 105 can be any type of electronic device having a processor and memory including but not limited to mobile phones, laptops, netbooks, and tablet computers. The computing device 105 shown in the exemplary embodiment in FIG. 1A provides a first wireless interface 110 and second wireless interface 115. These wireless interfaces can be various types of wireless interfaces that support a wide variety of different wireless transmission protocols, including but not limited to Wi-Fi protocol (such as IEEE 802.11a, IEEE 802.11b, IEEE 802.11g, and IEEE 802.11n), International Mobile Telecommunications-2000 (IMT-2000) (better known as 3G), Enhanced Data rates for GSM Evolution ("EDGE"), Evolution-Data Optimized ("EVDO"), WiMax, Bluetooth™, infrared transmission, and any other type of wireless data transmission. In the exemplary embodiment shown in FIG. 1A, the wireless interface aggregation system 100 provides an aggregation control module 120 enabled to control the transmission and reception of data packets on the first wireless interface 110 and the second wireless interface 115. In an exemplary embodiment, the aggregation control module 120 can provide a number various functional modules that monitor the transmission and reception of data packets on both wireless interfaces 110 and 115. Furthermore, the aggregation control module 120 in an exemplary embodiment can intelligently determine what data packets should be sent via a certain wireless interface and when those data packets should be sent.

In an exemplary embodiment, the aggregation control module 120 of the wireless interface aggregation system 100 can be implemented in software resident between Transport Layer 4 of the Open System Interconnection Reference Model ("OSI") model, which can control the reliability of a given link through flow control, segmentation/desegmentation, and error control, and the Network Layer 3 of the OSI model, which can provide the functional and procedural means of transferring variable length data packets from a source to a destination via one or more networks. Thus, the aggregation control module 120 in an exemplary embodiment can be implemented as Layer 3.5 software to intelligently control the transmission and reception of data packets passed between the Transport Layer and the Network Layer.

In this exemplary embodiment, the Layer 3.5 software aggregation control module 120 can monitor and/or intercept all data packets passed up from the Network Layer 3 and all data packets handed down from Transport Layer 4. For example, and not limitation, if the wireless interfaces 110 and 115 are operating using Transmission Control Protocol ("TCP")/Internet Protocol ("IP") links, the aggregation control module 120 can intercept data packets between the TCP layer and the IP layer. Thereby, the exemplary embodiment of the aggregation control module 120 can intelligently leverage the positive aspects of each wireless interface and minimize the negative aspects of each wireless interface.

Those of skill in the art will appreciate that although the exemplary embodiment of the computing device 105 in FIG. 1A provides only two wireless interfaces, the wireless interface aggregation system 100 can also be used in computing devices 105 with three or more wireless interfaces. In fact, many of the throughput improvement techniques implemented by the wireless interface aggregation system 100 improve with the addition of wireless interfaces to the computing device 105.

As shown in the exemplary embodiment depicted in FIG. 1A, the wireless interface aggregation system 100 can be provided entirely within the computing device 105. This architecture presents many deployment benefits, as the wireless interface aggregation system 100 in an exemplary embodiment requires deployment only at the computing device 105 and does not require any modifications or update, at the remote host, intermediate routers, access points, base stations, or other network equipment. Significantly, the remote host or other network devices in this exemplary embodiment can be unaware that the computing device 105 is implementing the wireless interface aggregation system 100. Those of skill in the art will appreciate that in alternative embodiments, the wireless interface aggregation system 100 can be implemented across many devices including the computing device 105, the remote host, and even network devices.

Figure 1B:
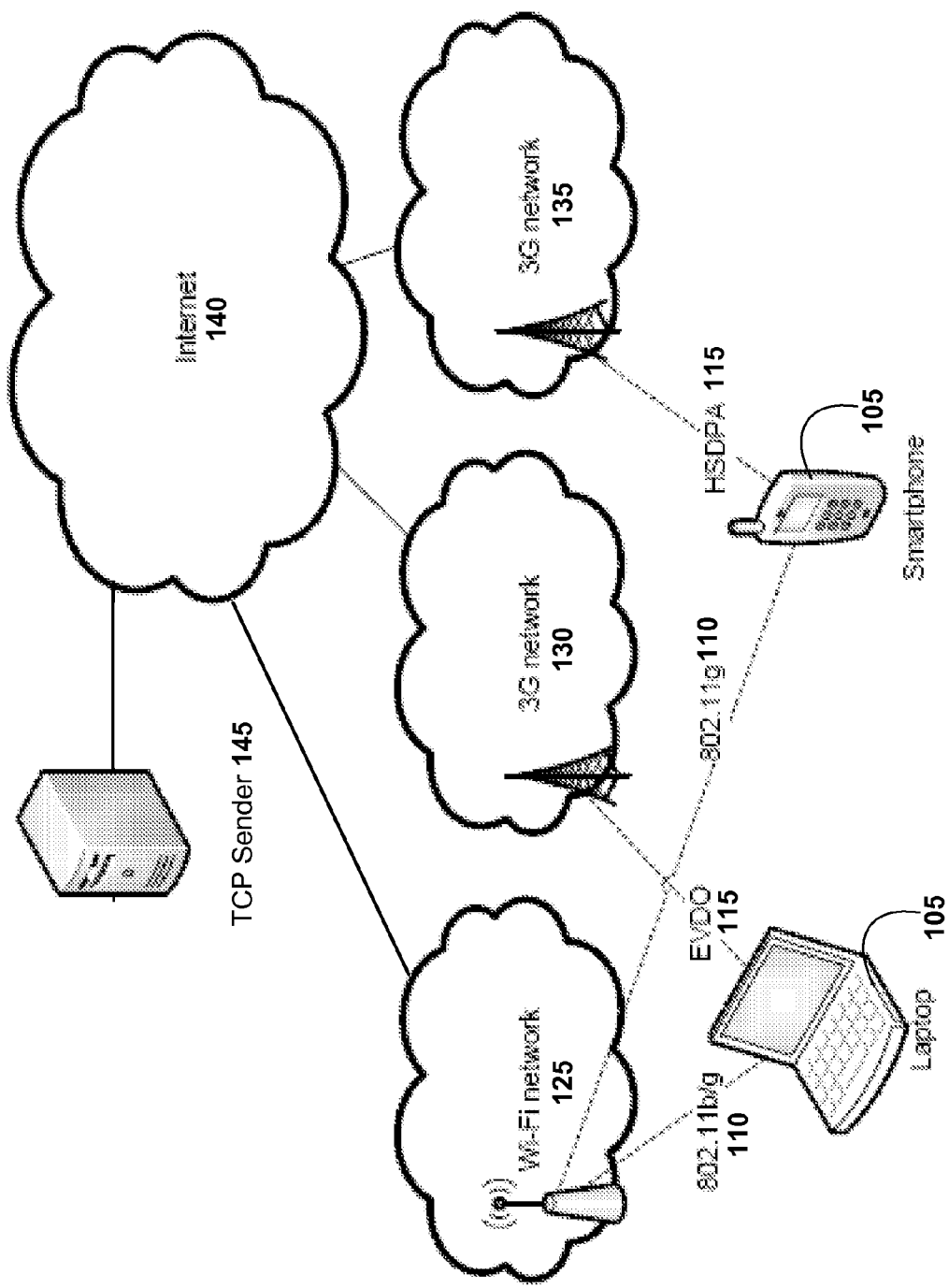
FIG. 1B illustrates a network environment for a multiple computing devices 105 provided with wireless interface aggregation systems 100 in accordance with an exemplary embodiment of the present invention.

FIG. 1B illustrates a network environment for a multiple computing devices 105 provided with wireless interface aggregation systems 100 in accordance with an exemplary embodiment of the present invention. As shown in FIG. 1B, one of the computing devices 105 is a laptop having two wireless interfaces: (1) an IEEE 802.11b/g Wi-Fi first wireless interface 110 and (2) an EVDO second wireless interface 115. As shown in FIG. 1B, an exemplary embodiment of the laptop computing device 105 can be situated in a network environment so as to be simultaneously linked to both a Wi-Fi network 125 and a 3G Network 130. By using the multiple wireless interfaces 110 and 115, the laptop computing device 105 can communicate with a distant TCP sender 145 via the Internet 140. The TCP Sender 145 can be any computer, server, or other computing device capable of transmitting data packets via the TCP transmission protocol. Furthermore, FIG. 1B illustrates that the other computing device 105 can be a smartphone computing device 105, having two wireless interfaces: (1) an IEEE 802.11g Wi-Fi first wireless interface 110 and (2) a High-Speed Downlink Packet Access ("HSDPA") second wireless interface 115. Similar to the laptop computing device 105, the smartphone computing device 105 can communicate with a distant TCP sender 145 via the Internet 140 using the multiple wireless interfaces 110 and 115. In an exemplary embodiment, each of computing devices 105 includes a wireless interface aggregation system 100 having an aggregation control module 120 capable of controlling the transmission and reception of data packets via the first wireless interface 110 and the second wireless interface 115 to provide a throughput capacity for the computing device in the network environment shown in FIG. 1B that is greater than sum of the observed throughput rate of the first interface 110 and the observed throughput rate of the second interface 115.

FIG. 2A provides an illustration of throughput measurements for various computing devices 105, including a laptop and a mobile telephone, as observed in a given environment. The throughput measurements shown on the left hand side of FIG. 2A illustrate the downstream traffic as observed at a conventional laptop having a 802.11(b) wireless interface over a Transmission Control Protocol ("TCP") link and multiple User Datagram Protocol ("UDP") links. The throughput measurements shown in the middle of FIG. 2 illustrate the downstream traffic as observed at a conventional laptop having an 802.11(g) wireless interface over a TCP link and multiple UDP links. The throughput measurements shown on the right hand side of FIG. 2A illustrate the downstream traffic as observed at a conventional mobile phone running the Google Android operating system a TCP link and multiple UDP links. The UDP packet sizes for the data shown in FIG. 2A are set to be the same as the TCP Maximum Segment Size ("MSS"). As shown in FIG. 2A, the UDP throughput capacity can be 30% higher than the TCP throughput in the 802.11g network and as much as 70% higher in the 802.11b network. The degraded performance by the TCP link can be attributed to two characteristics of TCP data transmission: (1) an upstream load imposed by TCP's Acknowledgment ("ACK") message traffic and the resulting self-contention; and (2) TCP's congestion control algorithm, which can potentially inhibit the connection throughput. A TCP data transmission implementation can be configured to send an ACK message for every two data packets, and the ACK message can be significantly smaller, such as providing a 20 byte IP payload as opposed to a 1480 byte IP payload for the standard data. Even though ACK messages can be smaller than standard data messages, the overheads imposed by the 802.11 protocol result in small sized ACK frames contending on an equal footing to the data frames at the ("Media Access Control") MAC layer. The various UDP implementations shown in FIG. 2A with increasing numbers of ACK messages per eight data packets mimic the behavior of TCP and illustrate the self-contention transmission degradation exhibited by TCP. The last UDP implementation, shown on right hand side of each graph in FIG. 2A, sends one ACK message for every two data packets, similar to most TCP configurations, which reduces throughput from 20 Mbps to 15 Mbps in the 802.11g network. The other UDP implementations graphed in FIG. 2A show that intermediate levels of self-contention also cause corresponding throughput reduction.

In accordance with an exemplary embodiment of the present invention, the throughput for TCP data transmission stream on a first wireless interface 110 can be improved by moving some of the ACK messages to a second wireless interface 115 by using selective offloading. In an exemplary embodiment of the wireless interface aggregation system 100, the aggregation control module 120 can include a selective offloading module, which can address self-contention. Those of skill in the art will appreciate that selective offloading module of an exemplary embodiment of the aggregation control module 120 can be used to address self-contention for a variety of transmission protocols, including, but not limited to, TCP. In an exemplary embodiment of the aggregation control module 120, the selective offloading module can be configured to divert uplink ACK messages to the second wireless interface 115 to prevent these messages from contending with the downlink data on the first wireless interface 110.

In an exemplary embodiment, the wireless interface aggregation system 100 is provided on a computing device 105, such as a laptop or mobile phone, with a first wireless interface 110 that is a Wi-Fi link and a second wireless interface 115 that is a 3G link. In this exemplary embodiment, the selective offloading module is configured to address certain challenges and limitations of the given Wi-Fi link and the 3G link. First, the 3G link of the second wireless interface 115 in an exemplary embodiment may not have sufficient bandwidth to send the required number of ACKs that will sustain the maximum TCP downlink throughput on the Wi-Fi link of the first wireless interface 110. This relatively low uplink bandwidth has two impacts on TCP transmission over the Wi-Fi link in this exemplary embodiment: (1) ACK messages may be dropped by the transmission buffer, which can render the TCP Sender unable to increase its congestion window or have more bursty transmissions, and (2) the 3G link can have a larger Round-Trip Time ("RTT"), which can increase the RTT observed by the TCP sender and slow down the growth rate of its congestion window and hence the overall throughput enjoyed by the TCP connection.

In an exemplary embodiment of the aggregation control module 120, the selective offloading module can address both the above mentioned challenges by intelligently and selectively controlling when the ACK messages are loaded and how many of the ACK messages are offloaded. First, in an exemplary embodiment of the selective offloading module, offloading can be performed only when the consequent RTT inflation does not adversely impact the growth of the TCP congestion window. In one example, this can occur when the congestion window is large (and hence the connection throughput is less dependent on congestion window growth rate), which is also when self-contention will be near its peak. In one embodiment, a simple heuristic can be used by the selective offloading module to set the offloading ACK message threshold as the slow-start threshold ("ssthresh") value that TCP uses in its congestion avoidance algorithm. In one embodiment, the ssthresh value can be 20 segments. Thereby, the selective offloading module can be performed to that fraction of ACK messages that are sustainable by the second wireless interface 115, a relatively low-bandwidth interface. The selective offloading module can then send the remaining ACK messages through the first wireless interface 110 of the computing device 105. For an exemplary embodiment of the wireless interface aggregation system 100 using a TCP transmission, the ACK messages in the beginning of a TCP congestion window are preferably sent over the second wireless interface 115 of relatively low bandwidth as opposed to those toward the rear-end of the congestion window to offset the delay differences and also to mitigate any adverse impacts of out of order receipt of ACK messages at the TCP sender.

FIG. 2B shows the state of a TCP connection for a conventional computing device during a loss or connectivity or blackout. The blackout shown in FIG. 2B occurs during a 2 second period, from around 2 seconds on the x-axis to around 4 seconds. In a conventional configuration, the TCP sender, unaware of the blackout, will lose all packets transmitted during the blackout and will experience a retransmission timeout. In this conventional configuration, the TCP sender subsequently will enter slow start and drop its congestion window to one. As the TCP sender in this conventional configuration cannot know the exact time the blackout ends, it will rely on retransmissions of the first segment in the congestion window followed by an exponential backoff in the RTO if no ACK messages are received. It is likely that when the blackout ends at the receiving computing device 105, the TCP sender will be waiting for the expiry of a TCP retransmission timeout. Those of skill in the art will appreciate that the unnecessary idle period experienced in the conventional configuration of waiting for the expiry of a TCP retransmission timeout coupled with the TCP connection starting back from a congestion window of one and a very small ssthresh (due to the back to back timeouts), can significantly reduce the throughput performance of the TCP data transmission link for conventional transmission configurations. For example, for the conventional TCP link receiving a blackout as shown in FIG. 2B, the throughput of the TCP connection is roughly reduced by half because of the two second blackout.

In accordance with an exemplary embodiment of the present invention, the wireless interface aggregation system 100 can provide an aggregation control module 120 which includes a proxying module. The proxying module in this exemplary embodiment can rely upon a second wireless interface 115 to notify the upstream data sender of the blackout events on the first wireless interface 110. Significantly, the exemplary embodiment of the can send data packets from the second wireless interface 115 that appear as if they have been sent from the first wireless interface 110. This proxy capability can enable the data packet sending device to be unaware of the blackout or other activities at the computing device 105, in an exemplary embodiment. Those of skill in the art will appreciate that there are many ways for the proxying module to emulate the first wireless interface 110 in data packets sent from the second wireless interface 115, such as IP spoofing and other spoofing techniques.

For example, and not limitation, the wireless interface aggregation system 100 is provided on a computing device 105, such as a laptop or mobile phone, with a first wireless interface 110 that is a Wi-Fi link and a second wireless interface 115 that is a 3G link. In this embodiment, the proxying module of the wireless interface aggregation system 100 can use the 3G link to notify a TCP Sender of the blackout events on the Wi-Fi link. In an exemplary embodiment of the wireless interface aggregation system 100 configured in a computing device 105 with a TCP data transmission connection, the proxying module of the aggregation control module 120 can send the notification in the form of a zero-window advertisement. Furthermore, in this exemplary embodiment the proxying module can send the notification and emulate the first wireless interface 110 as if it were sent from the TCP Receiver with the IP address of the Wi-Fi link on the first wireless interface 110. By sending a zero-window advertisement, the proxying module can freeze the TCP connection when a blackout occurs at the TCP Receiver, the computing device 105, by indicating to the TCP Sender that the buffer of the TCP Receiver is full. When the Wi-Fi link recovers from the blackout, the proxying module of this exemplary embodiment of the wireless interface aggregation system 100 can send a resume notification in the form of a non-zero window advertisement via the Wi-Fi link of the first wireless interface 110.

In accordance with certain TCP transmission protocol implementations, the TCP Sender will enter persist mode upon receiving a zero-window advertisement from the proxying module of an exemplary embodiment of the wireless interface aggregation system 100. Furthermore, when the TCP Sender in this exemplary embodiment receives the window update at a later point, the TCP Sender can restart sending segments from the first unacknowledged sequence number without reducing the congestion window or the slow-start threshold. Thereby, the proxying module of an exemplary embodiment of the wireless interface aggregation system 100 can rely upon the second wireless interface 115 to overcome the negative aspects of the TCP transmission protocol that would otherwise reduce the throughput possible on the first wireless interface 110.

In an exemplary embodiment of the aggregation control module 120, the proxying module can conduct blackout detection in real time, and yet introduce relatively low overhead. Conventional active methods of blackout detection can insert high overhead by attempting to actively monitor for blackouts at all times and, conversely, passive methods of blackout detection suffer from significant delays in blackout detection. In an exemplary embodiment, the proxying module provides hybrid blackout detection mechanism to achieve a high responsiveness with a low overhead. Those of skill in the art will appreciate that active link probing in some embodiments can generally involve the proxying module determining that the beginning and end of a blackout period that exists on the first wireless interface by receiving packets from an Access Point or sending packets toward the Access Point at different times.

In the exemplary embodiment of the hybrid blackout detection mechanism of the proxying module, active link probing can be performed after a passive link monitoring mechanism indicates that a blackout has likely occurred. In one embodiment, the hybrid blackout detection mechanism never activates active link probing unless the passive link monitoring indicates a blackout is present, to avoid inserting unnecessary overhead into the system. For example, and not limitation, the hybrid blackout detection mechanism of the proxying module can provide a passive link monitor to track whether data is being received at a wireless interface of interest. If no data is observed by the exemplary embodiment of the hybrid blackout detection mechanism for more than predetermined time period, such as 200 ms, the proxying module can initiate active link probing by causing the computing device 105 to send an ICMP ping message to its default gateway on the deficient wireless interface to determine whether a blackout has actually occurred. In an exemplary embodiment, if the hybrid blackout detection mechanism verifies, from the lack of a response to the ping message, that blackout has occurred, the proxying module can enable a zero-window advertisement to be transmitted through the second wireless interface 115. In an exemplary embodiment, the proxying module can continue to actively probe during the blackout by causing ICMP ping messages to be sent to the default gateway of the deficient first wireless interface 110 until it receives a positive response to the ping message. As soon as recovery from the blackout is verified (through the receipt of response to the ping) by an exemplary embodiment of the proxying module, a window update can be sent to the TCP Sender via the first wireless interface 110 to resume the connection.

FIG. 2C shows the TCP transmission protocol throughput rate observed at a conventional computing device when random wireless losses are present in the wireless network environment. Those of skill in the art will appreciate that the throughput rate for a TCP transmission protocol link is known to suffer in the presence of random losses in wireless environments. As shown in FIG. 2C, even a 1% packet loss can reduce a TCP connection's throughput to less than 20% of the achievable performance. One of the typical causes of the throughput degradation is the interpretation of all packet losses by the TCP transmission protocol to be due to network congestion and the subsequent reduction of the sending rate by half by the TCP sliding window flow control protocol. The flow control by the TCP transmission protocol may be unwarranted, however, as not all losses are due to network congestion. Significantly, random wireless losses can occur in a wireless network environment due to a high bit error rate in the wireless network due to low signal-to-noise-ratios because of channel fading, large distances between transmission and reception, or interference.

An exemplary embodiment of the aggregation control module 120 of the wireless interface aggregation system 100 can include a mirroring module enabled to distinguish congestion losses from random losses. By distinguishing between congestion losses and random losses, the mirroring module can enable the TCP Sender to react only to congestion losses. In an exemplary embodiment, the mirroring module can enable random loss experienced on a TCP link to be hidden, such that wherein a loss classified as a random loss is not reported by the computing device 105 back to the TCP sender. In an exemplary embodiment of the mirroring module, positive ACK messages can be sent for data packets, lost due to random loss, as if they were successfully received by the computing device 105. Thus, if such losses are not reported by an exemplary embodiment of the aggregation control module 120, the TCP Sender will not retransmit those segments and thus compromise on the guaranteed reliability semantics. To facilitate such loss hiding without compromising on the reliability semantics, an exemplary embodiment of the mirroring module of the aggregation control module 120 can establish a mirrored TCP connection with the second wireless interface 115 to fetch only the data packets that were lost due to random loss. In an exemplary embodiment, the mirroring module can fetch the data lost to random loss and insert the fetched data back into the byte stream of the original connection. Thereby, an exemplary embodiment of the mirroring module can fill the holes in the byte stream received on the first wireless interface 110 that were created by the random losses. Such loss hiding and lost segment fetching by an exemplary embodiment of the mirroring module via the second wireless interface 115, such as a 3G wireless interface can provide considerable benefits for the TCP connection.

Those of skill in the art will appreciate that, due to random loss, the Data Link Layer at the computing device 105 will receive corrupted frames that will be discarded due to the random loss errors. Segments lost due to congestion, however, will not be received by computing device 105 at all. With an appropriate interface into Data Link Layer, an exemplary embodiment of the mirroring module can gather information on frames discarded due to corruption and consequently classify losses as congestion losses or random wireless losses.

In an exemplary embodiment, the mirroring module of the aggregation control module 120 can rely upon Application Layer information. In an alternative embodiment, the mirroring module can rely on a simple connection set-up replay for mirroring the TCP connection on the first wireless interface 110. Specifically, in this alternative embodiment the sequence of messages exchanged after the set-up of the original connection can be replayed in order to mirror the original TCP connection.

In embodiments in which the second wireless interface 115 has a lower throughput capacity than the first wireless interface 110 in terms of data-rate, it is not possible to simply implement the mirroring module to fetch all the transmitted data to ensure successfully reception of data lost due to random loss. Therefore, in some embodiments, the mirroring module can be configured to perform selective and fast fetching, whereby the TCP Receiver can proactively acknowledge data packets that it does not need irrespective of whether it was received or not. In some embodiments, such data packets can be purged from the TCP Sender's buffer even before being transmitted by the sender. The exemplary embodiment of the mirroring module can fetch the data lost to random loss by sending sequence numbers corresponding to the randomly lost segments via the second wireless interface 115. In an exemplary embodiment, the mirroring module can place a guard time before fetching the desired segment to ensure throughput capacity is available on the second wireless interface 115. For example, and not limitation, the guard time set by the mirroring module can be at least one segment size divided by data rate, such as 256 ms. For new TCP connections that result in a new start sequence number, an exemplary embodiment of the mirroring module can appropriately offset the sequence number of segments (or bytes) received on the second wireless interface 115 to retrieve the sequence number pertinent to the original TCP connection. In certain embodiments, the new TCP connection establishment can result in a new start sequence number. In this exemplary embodiment, the mirroring module can appropriately offsets the sequence number of data segments (or bytes) received on the mirrored connection to retrieve the sequence number pertinent to the original TCP connection.

In exemplary embodiment of the wireless interface aggregation system 100, the aggregation control module 120 can include multiple control modules that work together to intelligently control the transmission and reception of data across multiple wireless interfaces. In an exemplary embodiment, aggregation control module 120 can include a selective offloading module, a proxying module, and a mirroring module. In this exemplary embodiment of the aggregation control module 120, the various modules can seamlessly work with each other to improve the overall throughput data rate observed at the computing device 105. For example, and not limitation, a computing device 105 having a Wi-Fi first wireless interface 110 and a 3G second wireless interface 115 can receive data packets at the Wi-Fi interface with deficiencies or holes caused random wireless losses. In this exemplary embodiment, the mirroring module can detect the lost data packets due to random loss, and the mirroring module can hide the lost data packets by requiring the selective offloading module to generate positive ACK messages for the lost data and send them via the 3G second wireless interface 115. Furthermore, in this exemplary embodiment, the mirroring module can recover the lost data packets by requesting that the lost data packets be fetched via the 3G second wireless interface 115, while it shares the 3G uplink capacity of the second wireless interface 115 with the ACK messages sent by the selective offloading module. If no data packets are received for a period of time on the Wi-Fi first wireless interface 110, the proxying module can detect the blackout and freeze the Wi-Fi TCP connection by sending a zero-window advertisement through the 3G second wireless interface 115 such that the advertisement appears to have been sent by the first wireless interface 110.

Exemplary embodiments of the wireless interface aggregation system 100 can be used to improve both downstream data transfer and upstream data transfer from the computing device 105. For example, and not limitation, the selective offloading module can send data packets on the first wireless interface 110 but labeling the second wireless interface 115 address as the source address. In one example, the selective offloading module can send a upstream data packet on the Wi-Fi first wireless interface 110 and spoof the data packet to appears as if sent from the second wireless interface 115. In this example, although data is sent on the Wi-Fi first wireless interface 110, the ACK messages will be received on the 3G second wireless interface 115 interface to avoid self-contention. Furthermore, a proxying module can operate on upstream data similar to the downstream data, but the zero-window advertisement and window updates can be sent to the TCP Sender in the local machine. Additionally, the mirroring module in exemplary embodiment for upstream traffic can operate without requiring the establishment of a real mirrored connection, as the mirroring module can merely retransmit the random losses and mask the loss information from the local TCP Sender.

Figure 3:
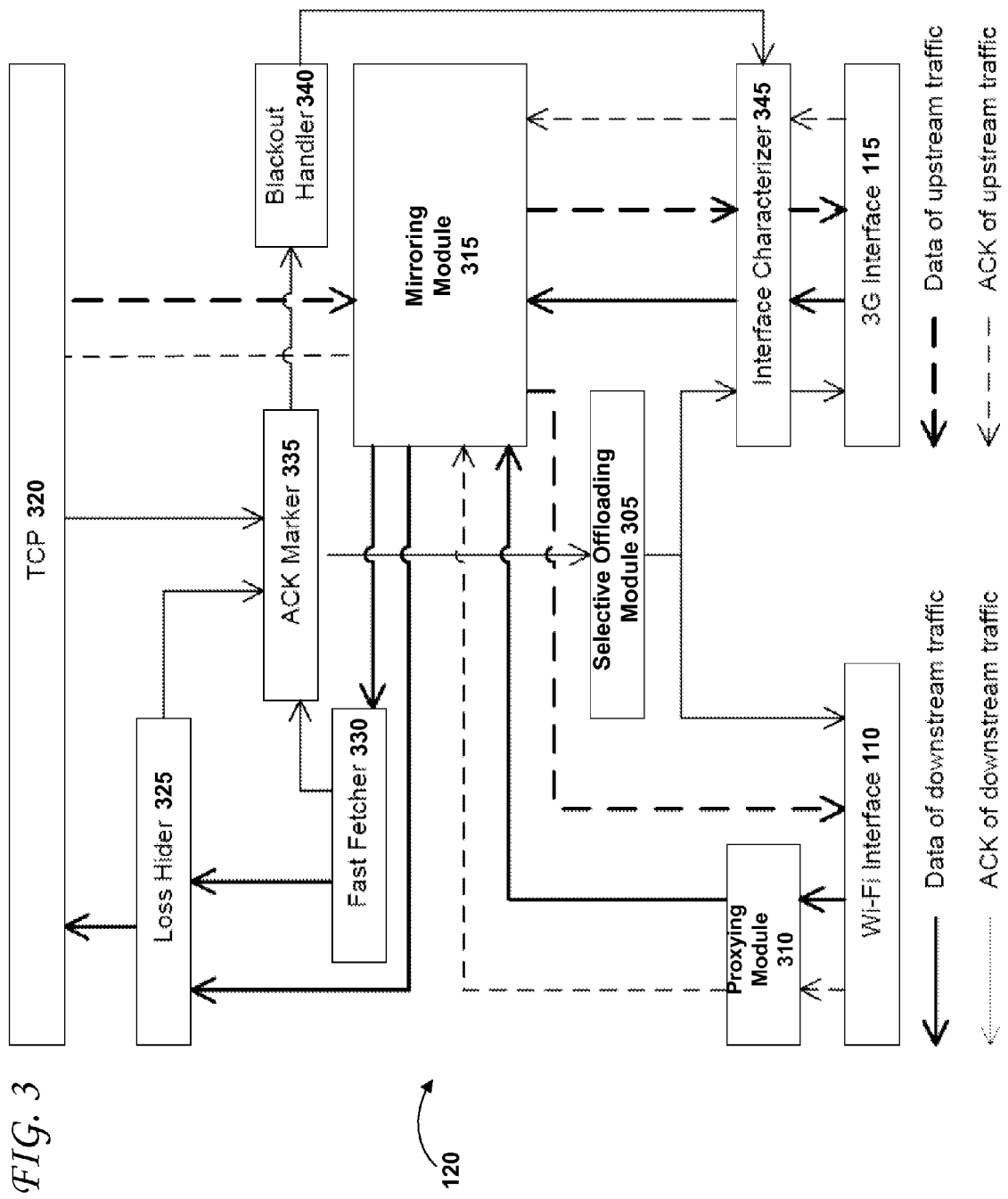
FIG. 3 provides a block diagram of the architecture for the wireless interface aggregation system 100 operating on a computing device 105 in accordance with an exemplary embodiment of the present invention.

FIG. 3 provides a block diagram of the architecture for the wireless interface aggregation system 100 operating on a computing device 105 in accordance with an exemplary embodiment of the present invention. The exemplary embodiment of the wireless interface aggregation system 100 shown in FIG. 3 is implemented on a computing device 105 having a Wi-Fi first wireless interface 110 and a 3G second wireless interface 115. Furthermore, the aggregation control module 120 is illustrated as Layer 3.5 Software implemented between the interfaces 110 and 115 and the TCP Transport Layer. FIG. 3 provides an illustration of data packet flow across components of an exemplary embodiment of the aggregation control module 120. FIG. 3 illustrates four types of TCP data packets: (1) data packets of downstream traffic (solid bold lines), (2) ACK messages for downstream traffic (thin bold lines), (3) data packets upstream traffic (bold dashed lines), (4) and ACK messages of upstream traffic (thin dashed lines).

For upstream traffic of data packets, an exemplary embodiment of the mirroring module 315 can record each data packet generated by the TCP layer 320 establish a mirroring connection on the 3G second wireless interface 115. In this exemplary embodiment, the mirroring module 315 can duplicate each data packet and configure the data packets with the IP address of the 3G second wireless interface 115 in the IP header of the data packets. The data packets of the original connection in this exemplary embodiment can be sent to the Wi-Fi first wireless interface 110. In this exemplary embodiment, the duplicate packets can be sent via the 3G second wireless interface 115 in the same order to establish a mirroring connection and request for the same content from TCP Sender.

In the exemplary embodiment of the wireless interface aggregation system 100 shown in FIG. 3, when a packet is received on the downlink of either one of the wireless interfaces 110 or 115, it can be an ACK message for previously sent data packets or data packets sent by the TCP Sender in response to a request from the computing device 105. Both the data packets and ACK messages may belong to the original connection on the Wi-Fi first wireless interface 110 or the mirroring connection on the 3G second wireless interface 115. In an exemplary embodiment, all packets received on any wireless interface can be sent to the mirroring module 315, which can differentiate between the four types of data packets. In an exemplary embodiment, the mirroring module 315 can distinguish between data packets belonging to the Wi-Fi first wireless interface 110 and the 3G second wireless interface 115 by comparing destination IP addresses with the record of mirroring. Furthermore, the mirroring module 315 can differentiate between data packets and ACK messages by calculating their TCP payload length. In one embodiment, TCP ACK messages belonging to the Wi-Fi first wireless interface 110 can be sent to TCP layer 320 without any modification. ACK messages belonging to the 3G second wireless interface 115 can be processed by the mirroring module 315. The mirroring module 315 in an exemplary embodiment can retransmit data packets if they are lost so that requests on the mirroring 3G second wireless interface 115 connection are the same as the original requests.

Similar to ACK messages for upstream traffic, in an exemplary embodiment downstream data packets belonging to the original Wi-Fi first wireless interface 110 connection and the mirroring 3G second wireless interface 115 connection can be treated separately. In an exemplary embodiment, the mirroring module 315 can first determine whether data received on the Wi-Fi interface 110 and the 3G interface 115 are identical. In the event that an exemplary embodiment of the mirroring module 315 determines that mirroring was not successful, the mirroring module 315 can sends notification to the Loss Hider 325 to stop hiding loss. Otherwise, the data packets belonging to the Wi-Fi interface 110 can be sent to the Loss Hider 325, and the data packets of the mirroring 3G interface 115 can be sent to the Fast Fetcher 330. In an exemplary embodiment of the aggregation control module 120, the Loss Hider 325 can send the in sequence data packets to TCP Layer 320. In the event that an exemplary embodiment of the mirroring module 315 determines there is lost data (i.e., a hole), in the received data packets and the hole is attributed to a random wireless loss, the Loss Hider 320 can store the out-of-sequence packets in a buffer and notify the Fast Fetcher 330 of the lost packets to fetch on the mirrored 3G interface 115. The Loss Hider 320, in an exemplary embodiment of the aggregation control module 120, would then sends a TCP ACK message for highest data sequence number it has seen in order to hide the data packet losses from the TCP Sender. Subsequently, the Loss Hider 325 can wait for the Fast Fetcher 330 to recover the lost packets via the 3G interface 115 and deliver the recovered data packets the Loss Hider 325 to be inserted into the buffered out-of-sequence data packets stored by the Loss Hider 325. The Fast Fetcher 320 can uses the a fast fetching technique to send ACK messages to accelerate packet sending on the mirroring 3G second wireless interface 115 connection.

ACK messages of downstream data packet traffic can be generated by the TCP Layer 320 in an exemplary embodiment and several components of the aggregation control module 120, such as the Loss Hider 325 and the Fast Fetcher 330. In an exemplary embodiment, those ACK messages can be sent to the ACK Marker 335 to perform appropriate offloading. In an exemplary embodiment of the aggregation control module 120, the ACK Marker 335 can be a part of the Selective Offloading Module 305. In an exemplary embodiment, the ACK Marker 335 can mark certain ACK messages as offloadable so that the Selective Offloading Module 305 knows they can be offloaded to the 3G interface 115. In some embodiments, the ACK Marker 335 can replace older ACK messages with more recent ACK messages, if an ACK message only contains cumulative information. The Selective Offloading Module 305 of an exemplary embodiment can take the ACK messages of both the Wi-Fi interface 110 and the mirroring 3G interface 115 for offloading via the 3G interface 115. In the event that the Selective Offloading Module 305 in an exemplary embodiment determines that the 3G interface 115 has enough up-link capacity for all ACK messages, the Selective Offloading Module 305 can offload all the ACK messages to the 3G interface 115. Otherwise, if the exemplary embodiment of the Selective Offloading Module 305 determines that the 3G interface 115 does not have enough uplink capacity for offloading of all the ACK messages, the Selective Offloading Module 305 can discard replaceable the ACK messages without affecting TCP operations. Otherwise, the exemplary embodiment of the Selective Offloading Module 305 can send the remaining ACK messages via the Wi-Fi interface 110.

In an exemplary embodiment, the Proxying Module 310 on the Wi-Fi interface 110 can passively monitor all activity events in Wi-Fi network to detect blackout and link recovery events. Furthermore, the Proxying Module 310 in an exemplary embodiment can actively send a probe message to a default gateway if no activity is observed on the Wi-Fi interface 110 for a period of time. In the event that the exemplary embodiment of the Proxying Module 310 detects a blackout, the Proxying Module 310 can send a blackout and link recovery notification to the Blackout Handler 340, which can then enable ACK messages to be sent with a zero-window advertisement and window update. Furthermore, in an exemplary embodiment, the Blackout Handler 340 can generated the ACK messages with latest ACK message sent by ACK Marker 335, and have flow window size modified by the Proxying Module 310. The ACK messages from the Blackout Handler 340 can directly go through 3G interface 115 while the Wi-Fi interface 110 is in blackout.

All four types of packets can traverse the Interface Characterizer 345 in an exemplary embodiment of the aggregation control module 120 if they are sent through 3G interface 115. The Interface Characterizer 345 can be used to measure the capacity on 3G interface 115 uplink and downlink. Additionally, the exemplary embodiment of the Interface Characterizer 345 can calculates remaining uplink/downlink capacity by subtracting data sent/received on 3G interface 115. Furthermore, the uplink and downlink capacity values can be send to the Selective Offloading Module 305 and the Fast Fetcher 330 to let them respond to capacity decrease. In an exemplary embodiment, the Selective Offloading Module 305 can reduces the amount of ACK messages sent to 3G interface 115 if there is not enough uplink capacity for those messages. Additionally, an exemplary embodiment of the Fast Fetcher 330 can also increase the guard time, when 3G interface 115 downlink capacity drops, to increase the probability for lost data packets to get through.

As shown in FIG. 3, an exemplary embodiment of the wireless interface aggregation system 100 can provide an aggregation control module 120 in a modular architecture such that it is evident how to reuse the common components for various aggregation techniques. As shown in the exemplary embodiment in FIG. 3, some components in this embodiment of the aggregation control module 120 are specific for TCP, while others provide common functionalities which can be used in aggregation control modules 120 for other transmission protocols. For example, the Selective Offloading Module 305 can be used for offloading ACK messages, Report Offloading, and Voice Offloading for many transmission protocols. Furthermore, in an exemplary embodiment the Selective Offloading Module 305 can rely upon the ACK Marker 335 to notify the Selective Offloading Module 305 that ACK messages should be offloaded to the second wireless interface 115. In an exemplary embodiment, the Report Offloading and Voice Offloading can have their own component to mark report packets and voice frames. The Selective Offloading Module 305 in an exemplary embodiment can take marked data packets and split them according to available uplink bandwidth on the second wireless interface 115. Other examples of generically applicable components include the blackout detection functionality of the Proxying Module 310 and the Interface Characterizer 345.

Figure 4:
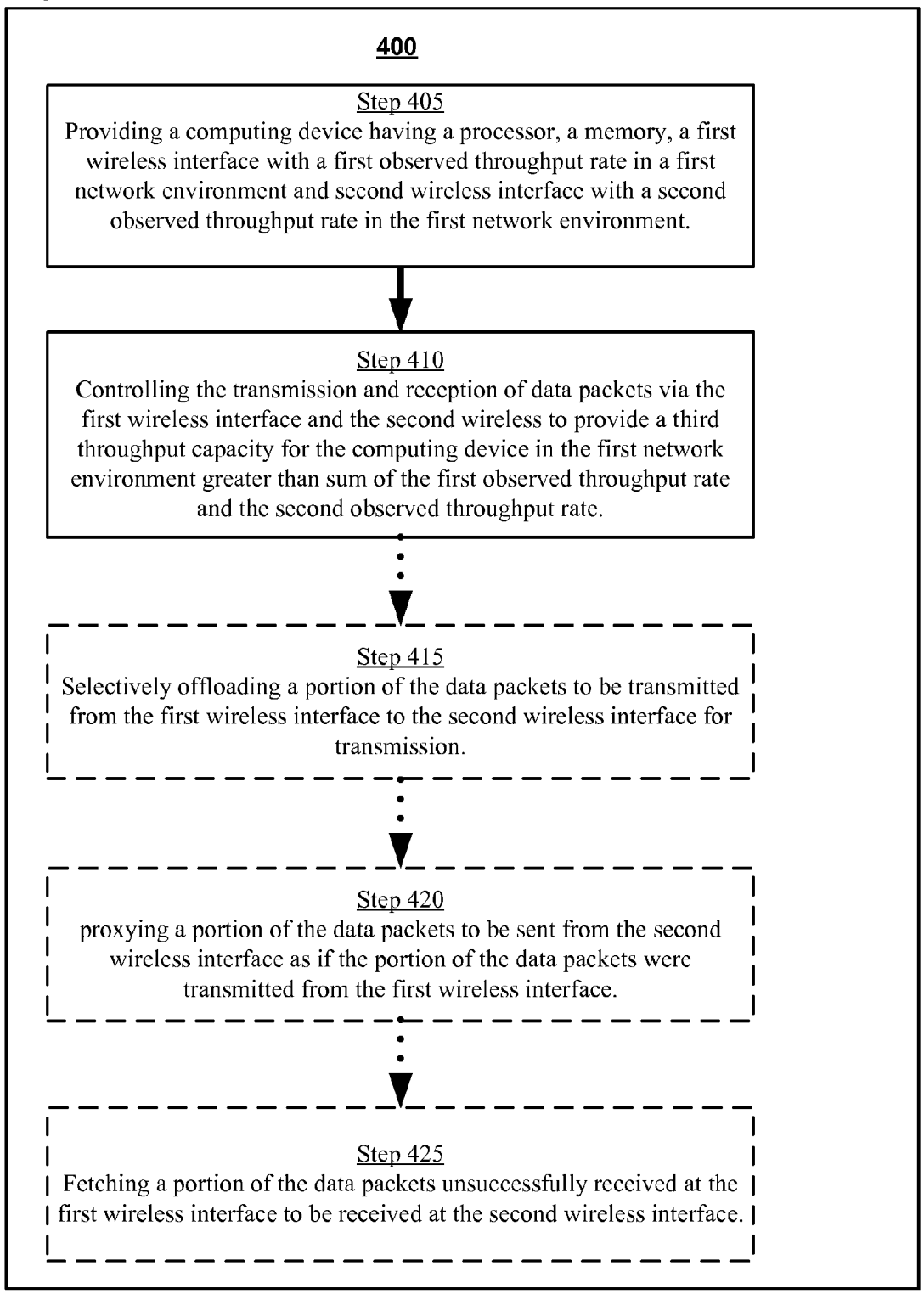
FIG. 4 provides an illustration of a block diagram of the method for wireless interface aggregation 400 in accordance with an exemplary embodiment of the present invention.

FIG. 4 provides an illustration of a block diagram of the method for wireless interface aggregation 400 in accordance with an exemplary embodiment of the present invention. As shown in FIG. 4, the first step 405 of an exemplary embodiment of the method for wireless interface aggregation 400 involves providing a computing device comprising a processor, a memory, a first wireless interface with a first observed throughput rate in a first network environment and second wireless interface with a second observed throughput rate in the first network environment. The second step 410 of an exemplary embodiment of the method for wireless interface aggregation 400 involves controlling the transmission and reception of data packets via the first wireless interface and the second wireless interface to provide an overall throughput rate for the computing device in the first network environment greater than sum of the first observed throughput rate and the second observed throughput rate.

FIG. 4 also provides certain optional steps (shown in dashed boxes) to the method for wireless interface aggregation 400 that can be added in exemplary embodiments. The third step 415 of an exemplary embodiment of the method for wireless interface aggregation 400 can involve selectively offloading a portion of the plurality of data packets to be transmitted from the first wireless interface to the second wireless interface for transmission. The fourth step 420 of an exemplary embodiment of the proxying a portion of the plurality of data packets to be sent from the second wireless interface as if the portion of the plurality of data packets were transmitted from the first wireless interface. The fifth step 425 of an exemplary embodiment of the fetching a portion of the plurality of data packets unsuccessfully received at the first wireless interface to be received at the second wireless interface.

Those of skill in the art will appreciate that the wireless interface aggregation system 100 can be implemented for a variety of transmission protocols, including TCP, UDP, Datagram Congestion Control Protocol ("DCCP"), Stream Control Transmission Protocol ("SCTP"), esource ReSerVation Protocol ("RSVP"), Explicit Congestion Notification ("ECN"), Open Shortest Path First ("OSPF"), Multipurpose Transaction Protocol, and may other transmission protocols. As non-limiting example of a non-TCP protocol implementation, the wireless interface aggregation system 100 can be used by a computing device 105 for rate-adaptive video streaming, a popular UDP application on the Internet. In this exemplary embodiment, a video server can send streams in the form of UDP datagrams to the computing device 105. To provide good video quality in response to capacity variation in the network environment, the video server can adjust its codec or sending rate based on available bandwidth to the computing device 105.

In an exemplary embodiment, the aggregation control module 120 can provide a selective offloading module to selectively offload some data packets to from the a first wireless interface 110 to a second wireless interface 115 of the computing device 105. For example, and not limitation, the selective offloading module can move certain ACK messages from the first wireless interface 110 to the second wireless interface 115 to resolve self-contention on the first wireless interface 110. Moving even these small data packets by the selective offloading module can provide significant improvements since the overhead of sending them via the first wireless interface 110 can be relatively high. The selective offloading module of an exemplary embodiment of the aggregation control module 120 can also be used to move data packets to the second wireless interface 115 when overall performance is affected by some characteristics that the first wireless interface 110 performs worse than the second wireless interface 115. For example, and not limitation, in rate-adaptive video streaming, the computing device 105 can keep sending reports of traffic characteristics to the video server for rate adaptation. In this non-limiting example, the rate adaptation and overall throughput may be impaired by intermittent availability of the first wireless interface 110, while the second wireless interface 115 can provide much higher availability. Furthermore, in this exemplary embodiment, the computing device 105 will be unable to send reports during periods of blackout and handoff. The video server in this exemplary embodiment may interpret the missing reports as client disconnection or network congestion. This incorrect characterization by the video server in the exemplary embodiment can cause improper rate adaptation of the video stream. In an exemplary embodiment of the aggregation control module 120, the selective offloading module can move report data packets to the second wireless interface 115, a link with relatively higher availability that enables continuous reporting, which allows the video server to do timely and accurate rate adaptation. The exemplary embodiment of the selective offloading module can also reduce packet loss rate of video on the downlink of the first wireless interface 110, since small report data packets can cause self-contention on the first wireless interface 110.

An exemplary embodiment of the aggregation control module 120 provides a proxying module, which can improve performance of the connection on the first wireless interface 110 by masquerading packets with the second wireless interface 115, which can serve as a proxy when first wireless interface 110 is temporarily unavailable. In exemplary embodiment, the proxying module enables communication when the first wireless interface 110 experiences a blackout. Enabling an exemplary embodiment of the proxying module to add control packets via the second wireless interface 115 can help prevent a the adverse effects to throughput data rates for the computing device 105 from blackouts. Additionally, an exemplary embodiment of the proxying module can improve reliability and timeliness of some data packets by sending them to both interfaces 110 and 115. For example, and not limitation, heterogeneous interfaces, such as Wi-Fi first wireless interface 110 and 3G second wireless interface 115, can provide diversity in packet losses, so sending a redundant packet to the second wireless interface 115 can effectively improve end-to-end reliability. Additionally, in exemplary embodiment, video streaming computing devices 105 can send command packets to perform control operations, such as pause/resume video delivery and updating configurations. For conventional systems, the loss of command data packets typically degrades response time perceived by the computing device 105. In an exemplary embodiment, the proxying module can proxy command data packets by sending a duplicate copy of those command data packets to improve the reliability. The proxying performed by an exemplary embodiment of the proxying module can improve response time to the computing device 105 and may also improve other dimensions of performance since commands are delivered more timely.

In an exemplary embodiment, the aggregation control module 120 provides a mirroring module that can create an independent connection on the second wireless interface 115, and same or related content to that received on the first wireless interface 110 can be downloaded on the second wireless interface 115 to improve performance by leveraging loss diversity. In on embodiment, the mirroring module can decouple some of the high-layer mechanisms to the mirroring connections, as in fetching data packets that were not successfully received on the first wireless interface 110. This helps the computing device 105 to separate operation of two mechanisms that have adverse interaction in some networks, such as Wi-Fi networks. Additionally, an exemplary embodiment of the mirroring module can reduce packet loss rate by fetching redundant contents from both interfaces 110 and 115, especially essential portions from the first wireless interface 110. Scalable video coding is known by those of skill in the art commonly considered in rate-adaptive video streaming since it encodes video content into different quality levels in a scalable way. For embodiments involving scalable video coding, the computing device 105 can receive baseline frames and those computing devices 105 with higher capacity can also receive enhancement frames that rely on baseline frames. In this embodiment, baseline frames are more critical packets and require less bandwidth than enhancement frames. Thus, an exemplary embodiment of the mirroring module can establish a mirroring connection via the second wireless interface 115 and request for a baseline video stream of the same video content. The ability to have duplicate baseline frames in this exemplary embodiment from the video server can significantly improve overall video quality, especially in a lossy environment.

Figure 5A:
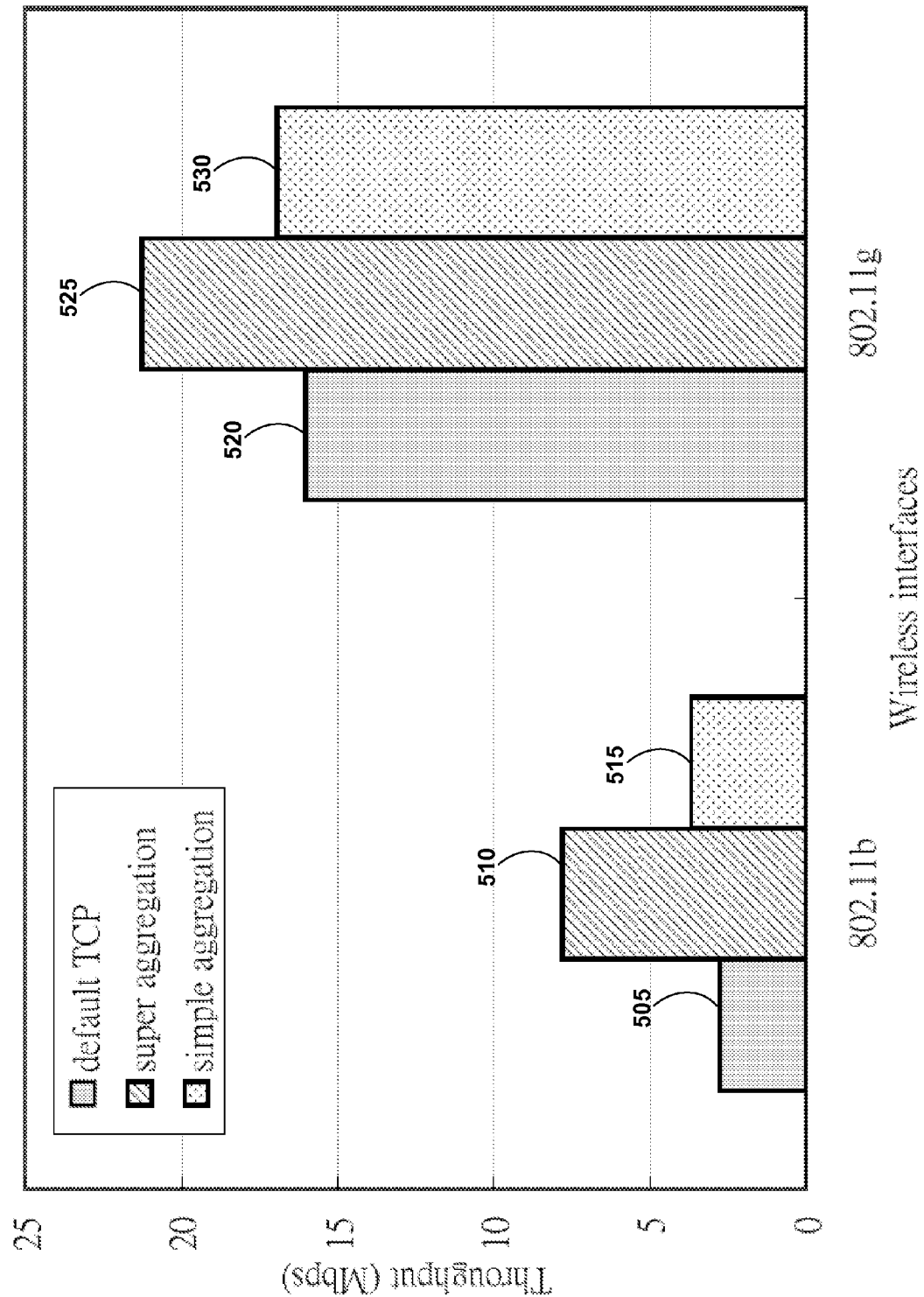
FIG. 5A provides an illustration of throughput measurements for a laptop computing device 105 provided with an exemplary embodiment of the wireless interface aggregation system 100 having an aggregation control module 120 with a selective offloading module, in accordance with an exemplary embodiment of the present invention.

FIG. 5A provides an illustration of throughput measurements for a laptop computing device 105 provided with an exemplary embodiment of the wireless interface aggregation system 100 having an aggregation control module 120 with a selective offloading module, in accordance with an exemplary embodiment of the present invention. FIG. 5A provides throughput measurement data for a laptop running 802.11(b) on the left hand side of the graph. FIG. 5A shows the measurement data 505 for a laptop computing device running 802.11(b) in a conventional default state relying upon one interface for TCP transmissions, the measurement data 515 for the laptop computing device running 802.11(b) in a conventional simple aggregation mode where the throughput of both interfaces is simply combined, and measurement data 510 for a laptop computing device 105 running 802.11(b) provided with a wireless interface aggregation system 100 having an aggregation control module 120 with a selective offloading module. As shown in FIG. 5A, the throughput rate for the laptop computing device 105 with the selective offloading module (510) is 152% higher that the throughput rate for the laptop computing device running conventional default TCP over one interface (505). FIG. 5A also shows the measurement data 520 for a laptop computing device running 802.11(g) in a conventional default state relying upon one interface for TCP transmissions, the measurement data 530 for the laptop computing device running 802.11(g) in a conventional simple aggregation mode where the throughput of both interfaces is simply combined, and measurement data 525 for a laptop computing device 105 running 802.11(b) provided with a wireless interface aggregation system 100 having an aggregation control module 120 with a selective offloading module. As shown in FIG. 5A, the throughput rate for the laptop computing device 105 with the selective offloading module (525) is 37% higher that the throughput rate for the laptop computing device running conventional default TCP over one interface (520).

Figure 5B:
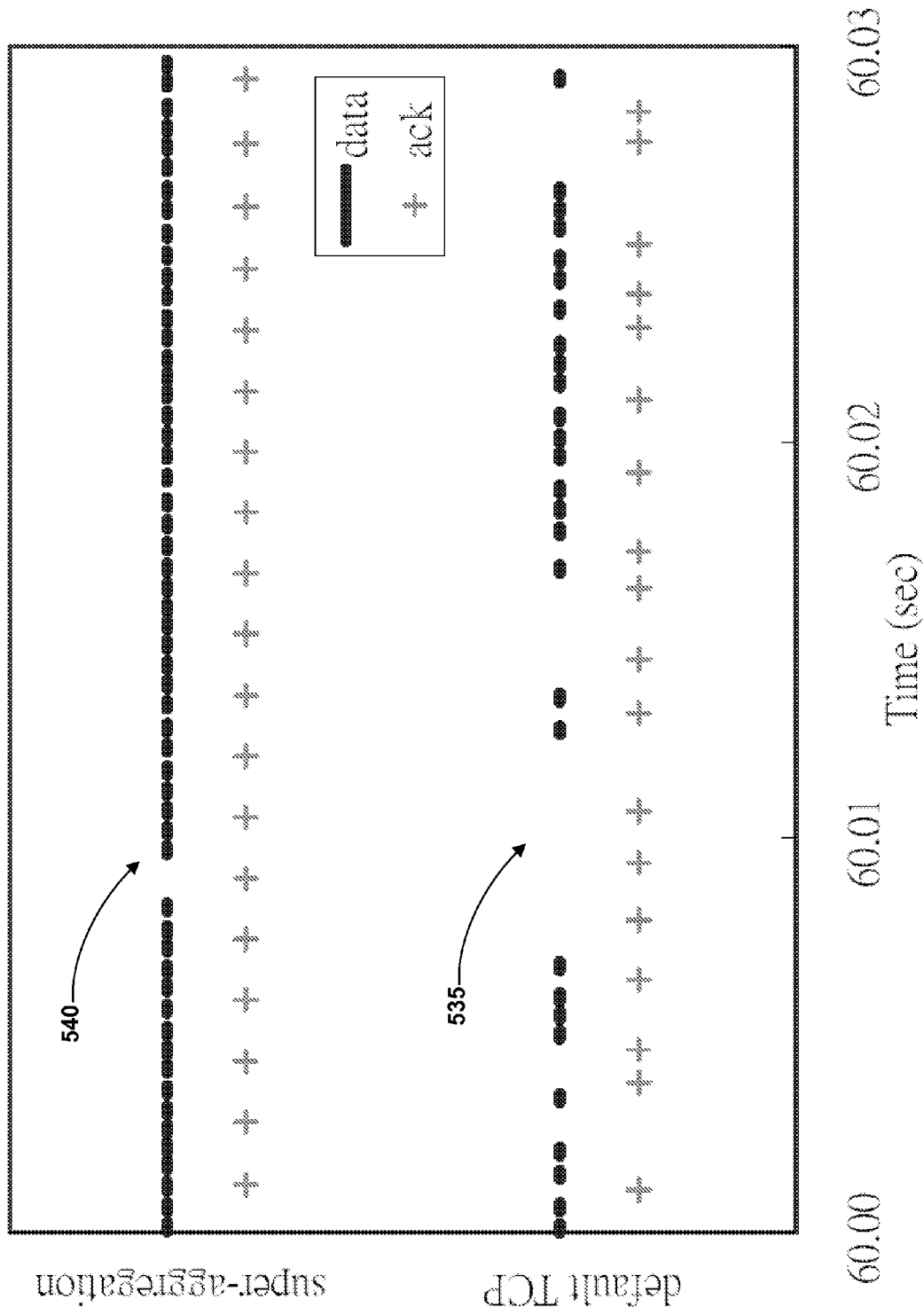
FIG. 5B provides an illustration of a data packet trace 535 captured from a conventional computing device and a data packet trace 540 from a computing device 105 with the wireless interface aggregation system 100 having an aggregation control module 120 providing a selective offloading module in accordance with an exemplary embodiment of the present invention.

FIG. 5B provides an illustration of a data packet trace 535 captured from a conventional computing device and a data packet trace 540 from a computing device 105 with the wireless interface aggregation system 100 having an aggregation control module 120 providing a selective offloading module in accordance with an exemplary embodiment of the present invention. The first data packet trace 535 in FIG. 5B demonstrates self-contention of conventional default TCP, in which data packets and ACK messages do not overlap in time. The second data packet trace 540 shows how the exemplary embodiment of the selective offloading module of the aggregation control module 120 can selectively offload ACK messages to the second wireless interface 115 to allow TCP to fully utilize the 802.11g first wireless interface 110 for downlink data.

Figure 5C:
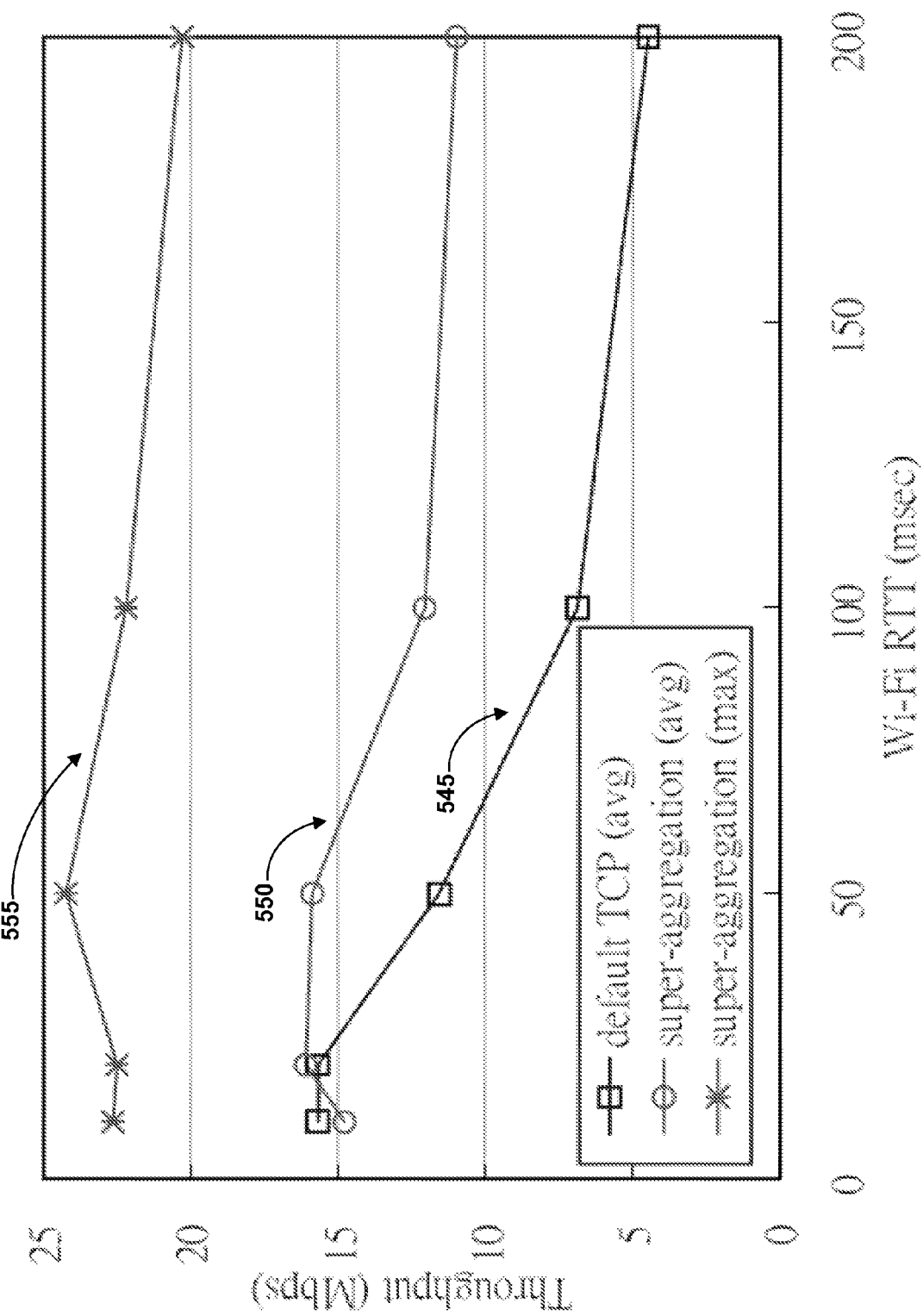
FIG. 5C provides an illustration of a throughput rate measurement 545 captured from a conventional computing device and a throughput rate measurements 550 and 555 from a computing device 105 with the wireless interface aggregation system 100 having an aggregation control module 120 providing a selective offloading module in accordance with an exemplary embodiment of the present invention.

FIG. 5C provides an illustration of a throughput rate measurement 545 captured from a conventional computing device and a throughput rate measurements 550 and 555 captured from a computing device 105 with the wireless interface aggregation system 100 having an aggregation control module 120 providing a selective offloading module in accordance with an exemplary embodiment of the present invention. As shown in FIG. 5C, the throughput rate 550 is greater that the throughput rate 545 when the RTT on the first wireless interface 110 is longer, since relative impact from the second wireless interface's 115 long RTT is smaller.

Figure 6A:
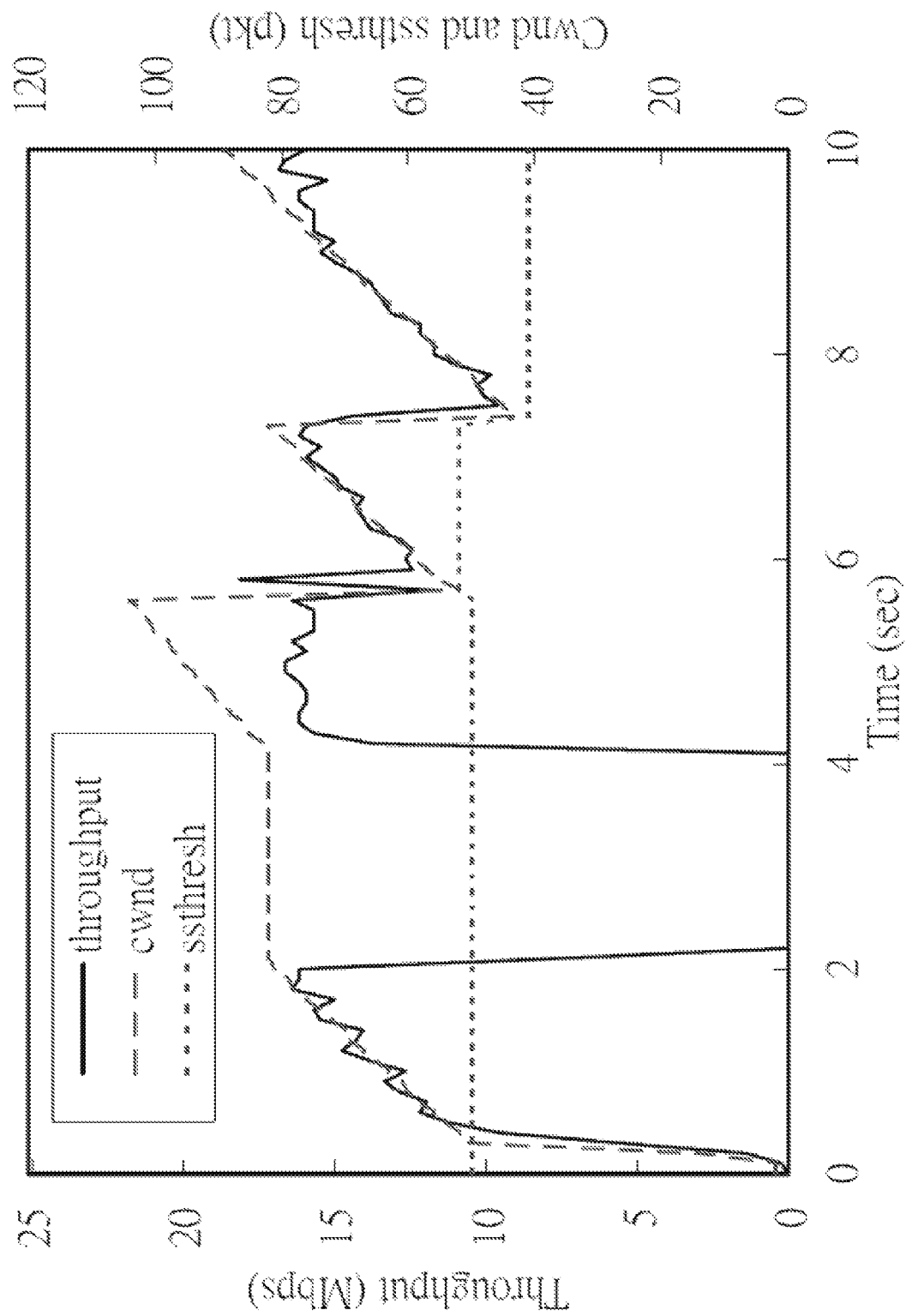
FIG. 6A provides a graph of the throughput rate during a blackout from a computing device 105 with the wireless interface aggregation system 100 having an aggregation control module 120 providing a proxying module in accordance with an exemplary embodiment of the present invention.

FIG. 6A provides a graph of the throughput rate during a blackout from a computing device 105 with the wireless interface aggregation system 100 having an aggregation control module 120 providing a proxying module in accordance with an exemplary embodiment of the present invention. FIG. 6A demonstrates the effectiveness of an exemplary embodiment of the proxying module by showing TCP throughput before and after blackout. As shown in FIG. 6A, the TCP connection does not go to slow start or cut down congestion window when receiving zero-window advertisement via the second wireless interface 115. Furthermore, the TCP throughput in this exemplary embodiment is shown as being immediately resumed after receiving window update after link comes back. Compared to default TCP configuration illustrated in FIG. 2B, the computing device 105 with the wireless interface aggregation system 100 having a proxying module improves TCP throughput during a blackout period by 87%.

Figure 6B:
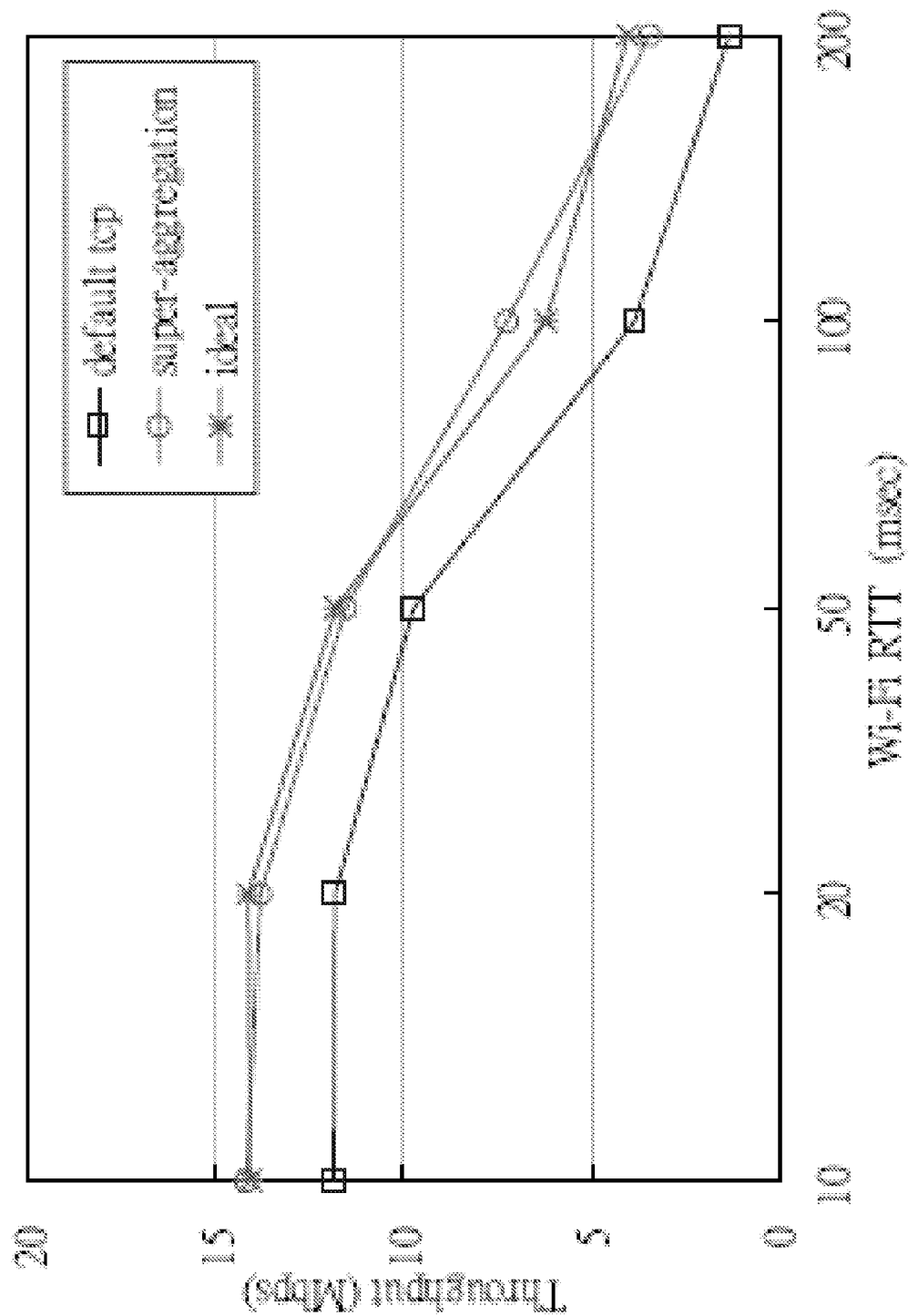
FIG. 6B shows throughput measurements of the wireless interface aggregation system 100 having a proxying module with different RTT times in accordance with an exemplary embodiment of the present invention.

FIG. 6B shows throughput measurements of the wireless interface aggregation system 100 having a proxying module with different RTT times in accordance with an exemplary embodiment of the present invention. As shown in FIG. 6B, the proxying module can provide close-to-ideal throughput with different RTT on a Wi-Fi interface, where ideal throughput values are calculated as throughput with no blackout times the ratio of link availability.

Figure 6C:
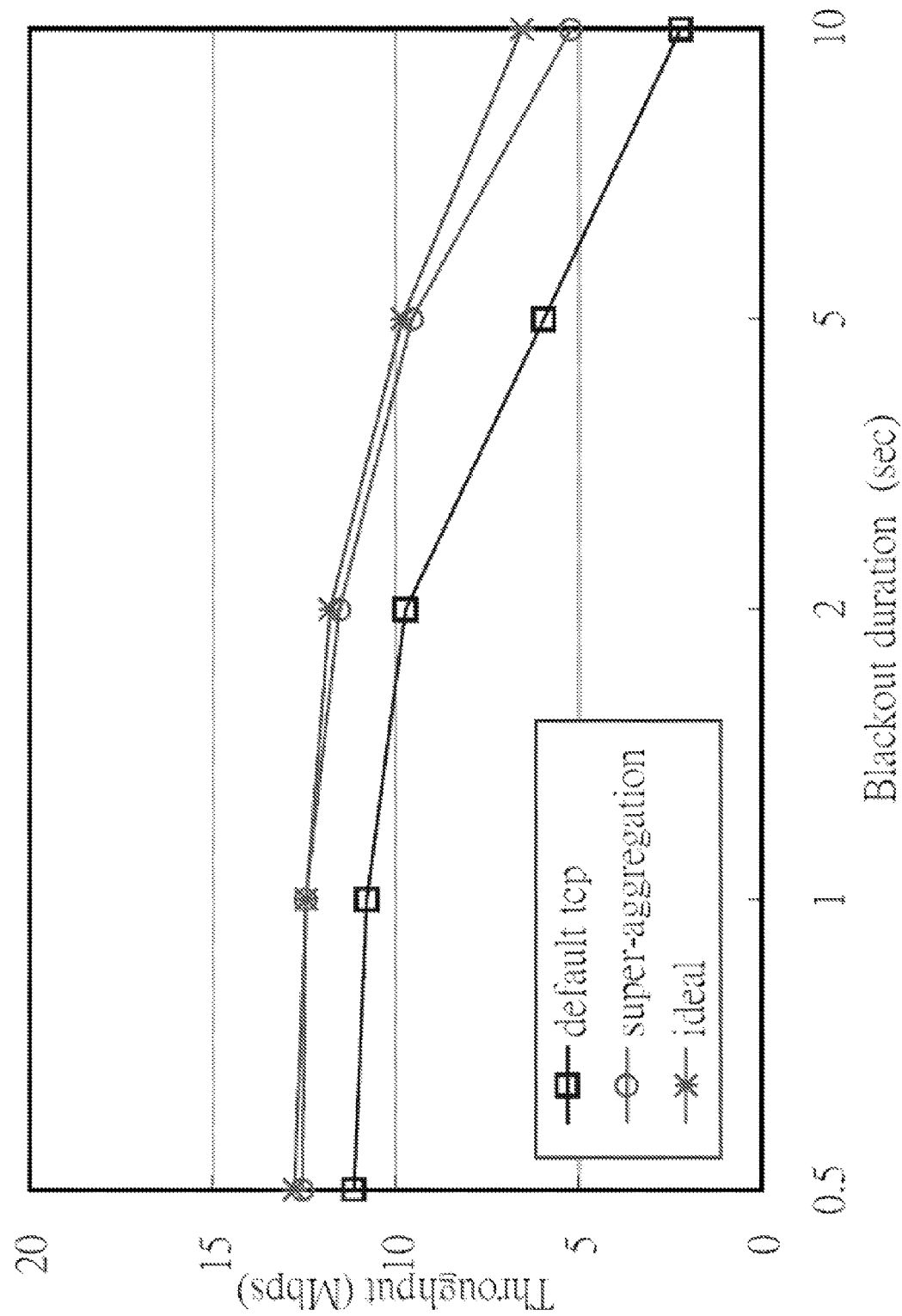
FIG. 6C shows throughput measurements of the wireless interface aggregation system 100 having a proxying module with different blackout durations in accordance with an exemplary embodiment of the present invention.

FIG. 6C shows throughput measurements of the wireless interface aggregation system 100 having a proxying module with different blackout durations in accordance with an exemplary embodiment of the present invention. As shown in FIG. 6C, the exemplary embodiment of the proxying module can provide more throughput improvement with a longer blackout duration.

The wireless interface aggregation system 100 provided in accordance with an exemplary embodiment of the present invention can be applied to any combination of wireless technologies. Furthermore, the wireless interface aggregation system 100 presents significant advantages for computing devices with multiple wireless interfaces that exhibit heterogeneity in terms of three characteristics: capacity, connectivity, and loss rate. Since the different wireless interfaces in these embodiments are likely to operate on different channels (to leverage the multiple interfaces in the first place) and hence will connect to different Access Points ("APs"), they naturally will have uncorrelated connectivity and packet losses. In exemplary embodiments where the interfaces have heterogeneous capacities, the aggregation control module 120 can assign the interface with the higher capacity as the primary interface. Thus, in this exemplary embodiment, the aggregation control module 120 can rely on the other interface to act as the secondary to enhance performance.

In exemplary embodiment in which the two interfaces have similar capacities, the aggregation control module 120 can assign the interface with better connectivity as the primary interface. In this embodiment, the aggregation control module 120 can rely on the other interface as the secondary interface. In the event that there is unutilized capacity on the second interface in this exemplary embodiment, the aggregation control module 120 can implement a simple aggregation technique to use up the remaining bandwidth on the second interface.

The wireless interface aggregation system 100 provided in accordance with an exemplary embodiment of the present invention can be effective in any computing device 105 having at least two heterogeneous wireless interfaces, including but not limited to Wi-Fi (802.11n), WiMAX, 3G, and Bluetooth. Additionally, an exemplary embodiment of the wireless interface aggregation system 100 can be effective for computing devices 105 having homogenous wireless interfaces, especially when capacity heterogeneity exists. For example, and not limitation, a computing device 105 having two Wi-Fi interfaces on the same computing device 105 can use different channels, and thus have different signal quality and data rates. In some embodiments with interfaces having homogenous capacities, such as two Wi-Fi interfaces with the same data rate, the aggregation control module 120 can still provide throughput improvements by using various modules combined with simple aggregation.

While a majority of the embodiments of the wireless interface aggregation system 100 discussed herein have involved computing devices 105 with two wireless interfaces, those of skill in the art will appreciate that the wireless interface aggregation system 100 can provide significant benefits to computing devices 105 with three or more wireless interfaces. In an exemplary embodiment of a wireless interface aggregation system 100 being used on a computing device 105 with three or more wireless interfaces, the various components of the aggregation control module 120 can be assigned to a different interface based on individual characteristics of each wireless interface. Additionally, if a wireless interface in an exemplary embodiment is underutilized, it can be used to share the load of another wireless interface. Furthermore, to the extent that an interface is underutilized, simple aggregation can be used by the aggregation control module 120 to maximize throughput.

For example, and not limitation, a computing device 105 provided with the wireless interface aggregation system 100 can have four interfaces using 802.11n, WiMAX, 3G and Bluetooth technologies respectively. In this embodiment, the exemplary embodiment of the aggregation control module 120 can select the wireless interface with the 802.11n link as the primary interface for the highest capacity supported. Additionally, the exemplary embodiment of the aggregation control module 120 can assign the WiMAX interface to be relied upon by the mirroring module for lost data fetching due to its relatively higher capacity. Furthermore, the Bluetooth interface of the exemplary embodiment of the computing device 105 can be relied upon by the proxying module of the aggregation control module 120 to carry proxy messages during a blackout, due to the relatively short latency and low bandwidth of the Bluetooth interface. Finally, the 3G interface can be relied upon by an exemplary embodiment of the selective offloading module of the aggregation control module 120 to handle sending offloaded ACK messages. In this exemplary embodiment, the WiMAX interface may have extra uplink capacity. Thus, the exemplary embodiment of the aggregation control module 120 could rely upon the WiMAX interface to share the loads from the selective offloading module. Thus, in this embodiment, TCP ACK messages with spoofed IP addresses can be sent via both the WiMAX interface and the 3G interface. If the WiMAX interface still has unutilized capacity, the aggregation control module 120 can move some data traffic on the WiMAX link.

While the invention has been disclosed in its preferred forms, it will be apparent to those skilled in the art that many modifications, additions, and deletions can be made therein without departing from the spirit and scope of the invention as set forth in the following claims.

What is claimed is:

1. A wireless interface aggregation system comprising:
    a computing device comprising a processor, a memory, a first wireless interface with a first observed throughput rate in a first network environment and a second wireless interface with a second observed throughput rate in the first network environment; and
    an aggregation control module to control the transmission and reception of a plurality of data packets with the first wireless interface and the second wireless interface, wherein the aggregation control module comprises:
        a selective offloading module configured to selectively offload a first portion of the plurality of data packets intended to be transmitted on the first wireless interface to be transmitted on the second wireless interface;
        a proxying module configured to enable a second portion of the plurality of data packets to be sent from the second wireless interface to appear as the second portion of the plurality of data packets were transmitted from the first wireless interface, wherein the proxying module is further configured to determine when a blackout exists on the first wireless interface to enable the second portion of the plurality of data packets to be sent from the second wireless interface, the second portion of the plurality of data packets including a zero window advertisement; and
        a mirroring module configured to enable a third portion of the plurality of data packets to be received by the first wireless interface and to enable the same third portion of the plurality of data packets to be received by the second wireless interface,
    wherein the aggregation control module is enabled to provide an overall throughput rate for the computing device in the first network environment greater than sum of the first observed throughput rate and the second observed throughput rate.

2. The wireless interface aggregation system of claim 1, wherein the first portion of the plurality of data packets selectively offloaded to the second wireless interface includes at least one status report message.

3. The wireless interface aggregation system of claim 1, wherein the first portion of the plurality of data packets selectively offloaded to the second wireless interface includes at least one acknowledgement message.

4. The wireless interface aggregation system of claim 3, wherein the at least one acknowledgement message is selectively offloaded when the selective offloading module determines that the transmission of the at least one acknowledgement message would contend with a fourth portion of the plurality of data packets to be received on the first wireless interface.

5. The wireless interface aggregation system of claim 3, wherein the at least one acknowledgement message is selectively offloaded at a rate that is determined by a bandwidth of the second wireless interface.

6. The wireless interface aggregation system of claim 1, wherein the second portion of the plurality of data packets sent from the second wireless interface is configured by the proxying module to appear as if sent from a local address of the first wireless interface.

7. The wireless interface aggregation system of claim 1, wherein the second portion of the plurality of data packets includes a control command message.

8. The wireless interface aggregation system of claim 1, wherein the proxying module is configured to determine when a blackout on the first wireless interface has ended and the proxying module enables a fifth portion of the plurality of data packets to be sent from the first wireless transmission interface, the fifth portion of the plurality of data packets including a non-zero window advertisement.

9. The wireless interface aggregation system of claim 1, wherein the proxying module determines a beginning or an end of a blackout period that exists on the first wireless interface by receiving data packets from an access point for the computing device or sending data packets toward the access point at different times.

10. The wireless interface aggregation system of claim 1, wherein the mirroring module is configured to obtain the third portion of the plurality of data packets by replaying a portion or all of the plurality of data packets observed on an uplink of the first wireless interface.

11. The wireless interface aggregation system of claim 1, wherein the mirroring module is configured to enable a request for a lost portion of the plurality of data packets to be sent from the second wireless interface and can enable the lost portion of the plurality of data packets to be received by the second wireless interface.

12. The wireless interface aggregation system of claim 11, wherein the mirroring module selectively fetches the lost portion of the plurality of data packets by proactively sending at least one acknowledgement message to a sender of the plurality of data packets.

13. The wireless interface aggregation system of claim 12, wherein the transmission of the at least one acknowledgement message that will trigger the retransmission of the lost portion of the plurality of data packets is delayed for a predetermined period of time.

14. The wireless interface aggregation system of claim 11, wherein the mirroring module is enabled to retransmit the lost portion of the plurality of data packets and send an acknowledgement message regarding a latest received portion of the plurality of data packets to the sender at a local address of the first wireless interface.

15. A method for wireless interface aggregation comprising:
    providing a computing device comprising a processor, a memory, a first wireless interface with a first observed throughput rate in a first network environment and a second wireless interface with a second observed throughput rate in the first network environment;
    providing an aggregation control module to control the transmission and reception of a plurality of data packets with the first wireless interface and the second wireless interface, wherein the aggregation control module comprises:
- a selective offloading module is configured to selectively offload a first portion of the plurality of data packets intended to be transmitted on the first wireless interface to be transmitted on the second wireless interface;
- a proxying module is configured to enable a second portion of the plurality of data packets to be sent from the second wireless interface to appear as the second portion of the plurality of data packets were transmitted from the first wireless interface; and
- a mirroring module is configured to enable a third portion of the plurality of data packets to be received by the first wireless interface and to enable the same third portion of the plurality of data packets to be received by the second wireless interface, wherein the aggregation control module is enabled to provide an overall throughput rate for the computing device in the first network environment greater than sum of the first observed throughput rate and the second observed throughput rate; and proxying the second portion of the plurality of data packets to be sent from the second wireless interface to appear as the second portion of the plurality of data packets were transmitted from the first wireless interface, wherein the proxying is completed after determining a blackout exists on the first wireless interface and the second portion of the plurality of data packets sent from the second wireless interface includes a zero window advertisement.

16. The method for wireless interface aggregation of claim 15, wherein the first portion of the plurality of data packets selectively offloaded to the second wireless interface includes at least one acknowledgement message.

17. The method for wireless interface aggregation of claim 16, wherein the at least one acknowledgement message is selectively offloaded after determining that the transmission of the at least one acknowledgement message would contend with a fourth portion of the plurality of data to be received on the first wireless interface.

18. The method for wireless interface aggregation of claim 15, further comprising fetching the third portion of the plurality of data packets unsuccessfully received at the first wireless interface to be received at the second wireless interface.

19. A wireless interface aggregation system comprising:
- a computing device comprising a processor, a memory, a first wireless interface with a first observed throughput rate in a first network environment and a second wireless interface with a second observed throughput rate in the first network environment; and
- an aggregation control module to control the transmission and reception of a plurality of data packets with the first wireless interface and the second wireless interface, wherein the aggregation control module comprises:
  - a selective offloading module configured to selectively offload a first portion of the plurality of data packets intended to be transmitted on the first wireless interface to be transmitted on the second wireless interface;
  - a proxying module configured to enable a second portion of the plurality of data packets to be sent from the second wireless interface to appear as the second portion of the plurality of data packets were transmitted from the first wireless interface; and
  - a mirroring module configured to enable a third portion of the plurality of data packets to be received by the first wireless interface and to enable the same third portion of the plurality of data packets to be received by the second wireless interface, wherein the mirroring module is further configured to enable a request for a lost portion of the plurality of data packets to be sent from the second wireless interface and is configured to enable the lost portion of the plurality of data packets to be received by the second wireless interface and selectively fetches the lost portion of the plurality of data packets by proactively sending at least one acknowledgement message to a sender of the plurality of data packets, wherein the aggregation control module is enabled to provide an overall throughput rate for the computing device in the first network environment greater than sum of the first observed throughput rate and the second observed throughput rate.

20. The wireless interface aggregation system of claim 19, wherein the transmission of the at least one acknowledgement message that will trigger the retransmission of the lost portion of the plurality of data packets is delayed for a predetermined period of time.

21. The wireless interface aggregation system of claim 19, wherein the mirroring module is enabled to retransmit the lost portion of the plurality of data packets and send an acknowledgement message regarding a latest received portion of the plurality of data packets to the sender at a local address of the first wireless interface.

* * * * *

UNITED STATES PATENT AND TRADEMARK OFFICE
CERTIFICATE OF CORRECTION

PATENT NO. : 9,655,003 B2
APPLICATION NO. : 13/256749
DATED : May 16, 2017
INVENTOR(S) : Raghupathy Sivakumar et al.

It is certified that error appears in the above-identified patent and that said Letters Patent is hereby corrected as shown below:

In the Specification

At Column 1, Line 21, please insert the following paragraph:
-- STATEMENT REGARDING FEDERALLY SPONSORED RESEARCH
This invention was made with government support under grant number CNS0519733 awarded by the National Science Foundation. The government has certain rights in the invention. --

Signed and Sealed this
Fourteenth Day of May, 2019

Andrei Iancu
*Director of the United States Patent and Trademark Office*